US011161987B2

(12) United States Patent
Detty et al.

(10) Patent No.: US 11,161,987 B2
(45) Date of Patent: Nov. 2, 2021

(54) MIXED TRANSITION METAL OXIDES SILICA XEROGELS AS ANTIFOULING/FOULING RELEASE SURFACES

(71) Applicant: The Research Foundation for The State University of New York, Amherst, NY (US)

(72) Inventors: Michael Detty, Rochester, NY (US); Damon Corey, Amherst, NY (US); Caitlyn Gatley, Cheektowaga, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 86 days.

(21) Appl. No.: 16/060,566

(22) PCT Filed: Dec. 9, 2016

(86) PCT No.: PCT/US2016/065905
§ 371 (c)(1),
(2) Date: Jun. 8, 2018

(87) PCT Pub. No.: WO2017/100629
PCT Pub. Date: Jun. 15, 2017

(65) Prior Publication Data
US 2018/0362778 A1    Dec. 20, 2018

Related U.S. Application Data

(60) Provisional application No. 62/265,206, filed on Dec. 9, 2015.

(51) Int. Cl.
| | |
|---|---|
| *C09D 5/16* | (2006.01) |
| *C01B 33/16* | (2006.01) |
| *C08G 77/58* | (2006.01) |
| *C09D 1/00* | (2006.01) |
| *C08G 83/00* | (2006.01) |
| *C09D 7/63* | (2018.01) |
| *C09D 183/14* | (2006.01) |

(52) U.S. Cl.
CPC ............ *C09D 5/1675* (2013.01); *C01B 33/16* (2013.01); *C01B 33/163* (2013.01); *C08G 83/001* (2013.01); *C09D 1/00* (2013.01); *C09D 5/1618* (2013.01); *C09D 5/1625* (2013.01); *C09D 5/1656* (2013.01); *C09D 5/1681* (2013.01); *C09D 7/63* (2018.01); *C09D 183/14* (2013.01); *C08G 77/58* (2013.01)

(58) Field of Classification Search
USPC .......................... 106/287.11, 287.13, 287.16
See application file for complete search history.

(56) References Cited

U.S. PATENT DOCUMENTS

| | | | |
|---|---|---|---|
| 5,433,956 A * | 7/1995 | Patel | ........................ A61K 6/20 424/400 |
| 5,558,701 A | 9/1996 | Patel | |
| 6,391,808 B1 * | 5/2002 | Stiegman | ................ C03C 1/006 423/326 |
| 6,995,113 B1 | 2/2006 | Weisbeck et al. | |
| 7,244,295 B2 | 7/2007 | Detty et al. | |
| 7,780,875 B2 | 8/2010 | Asgari | |
| 7,799,432 B2 | 9/2010 | Becker-Willinger et al. | |
| 8,080,223 B2 | 12/2011 | Jarrell et al. | |
| 8,747,542 B2 | 6/2014 | Murakami et al. | |
| 8,981,139 B2 | 3/2015 | Schoenfisch et al. | |
| 9,302,247 B2 | 4/2016 | Begag et al. | |
| 2003/0167878 A1 | 9/2003 | Al-Salim et al. | |
| 2011/0259571 A1 * | 10/2011 | Yamasaki | ................ C09D 5/14 165/185 |
| 2012/0312192 A1 | 12/2012 | Detty et al. | |
| 2014/0120730 A1 * | 5/2014 | Nakajima | ................. G03F 7/40 438/703 |
| 2015/0191606 A1 | 7/2015 | Tavares Andre et al. | |
| 2016/0185978 A1 | 6/2016 | Gittens et al. | |

FOREIGN PATENT DOCUMENTS

| | | |
|---|---|---|
| EP | 1825752 A2 | 8/2007 |
| WO | 2008/052510 A1 | 5/2008 |
| WO | 2015/114091 A1 | 8/2015 |

OTHER PUBLICATIONS

"Adsorption Properties of Xerogel Prepared from Mixed Titanium and Silicon Alkoxides" authored by Kunetsova et al. and published in Colloid Journal (2015) 77(4), 451-457.*
Abstract for CN 102442683 (May 2012).*
"Preparation and Utilization of Organically Modified Silica-Titania Photocatalysts for Decontamination of Aquatic Environments" authored by Dagan et al. and published in Chemistry of Materials (1995) 7, 446-453.*
Abstract for CN 102838288 (Dec. 2012).*
Machine translation of CN 102838288 (no date).*
Abstract for Silica-Titania Sol-gel Hybrid Materials: Synthesis, Characterization, and Potential Application in Solid Phase Extraction authored by de Moraes et al. and published in Talanta (2003) 59(5), 1039-1044.*
"Synthesis and Characterization of V2O5-SiO2 Xerogel Composites Prepared by Base-catalyzed Sol-gel Method" authored by Barbosa et al. and published in the Journal of Non-Crystalline Solids (2006) 352, 3009-3014.*
Abstract for CN 102442683 (Sep. 2011).*
Machine translation of CN 102442683 (no date).*

(Continued)

*Primary Examiner* — Marc S Zimmer
(74) *Attorney, Agent, or Firm* — Hodgson Russ LLP

(57) ABSTRACT

Xerogels and compositions comprising xerogels comprising a transition metal oxide and silicon oxide xerogel matrix. The xerogels and compositions can be made from mixtures of transition metal alkoxide(s) and tetraalkoxysilane(s) and, optionally, alkyltrialkoxysilane(s), aminoalkyl-, alkylaminoalkyl-, dialkylaminoalkyltrialkoxysilane(s), or a combination thereof. The xerogels and compositions can be used as antifouling coatings on, for example; boats.

17 Claims, 6 Drawing Sheets

(56) References Cited

OTHER PUBLICATIONS

Ikawa, J. et al., Preparation and Photocatalytic Properties of TiO2-SiO2 Mixed Oxides with Different TiO2/SiO2 Ratio and Brownmillerite Type Calcium Ferrite, Proceedings of International Symposium on EcoTopia Science, 2007, pp. 959-964.
Schottner, G., Hybrid Sol-Gel-Derived Polymers: Applications of Multifunctional Materials, Chem. Mater., 2001, vol. 13, No. 10, pp. 3422-3435.
Damon, C.A., et al., The performance of hybrid titania/silica-derived xerogels as active antifouling/fouling-release surfaces against the marine alga *Ulva linza*: in situ generation of hypohalous acids, Biofouling, 2016, vol. 32, No. 8, pp. 883-896.
Destino, J.F., et al., Probing Nanoscale Chemical Segregation and Surface Properties of Antifouling Hybrid Xerogel Films, Langmuir, Mar. 4, 2015, vol. 31, p. 3510-3517.
Natalio, F., et al., Vanadium pentoxide nanoparticles mimic vanadium haloperoxidases and thwart biofilm formation, Nature Nanotechnology, Jul. 2012, vol. 7, pp. 530-535.
Tang, Y., et al., Hybrid xerogel films as novel coatings for antifouling and fouling release, Biofouling, 2005, vol. 21, No. 1, pp. 59-71.
Gatley, C.M., et al., Xerogel-Sequestered Silanated Organochalcogenide Catalysts for Bromination with Hydrogen Peroxide and Sodium Bromide, Molecules, May 26, 2015, vol. 20, No. 6, pp. 9616-9639.
Barbosa, G.N., et al., Preparation of silica microspheres coated with V2O5 xerogel and V2O5/WO3 composite xerogel via adapted Stober process, Journal of Non-Crystaline Solids, Apr. 28, 2008, vol. 354, pp. 3548-3553.

\* cited by examiner

MIXED TRANSITION METAL OXIDES SILICA XEROGELS AS ANTIFOULING/FOULING RELEASE SURFACES

CROSS REFERENCE TO RELATED APPLICATIONS

This application claims priority to U.S. Provisional Application No. 62/265,206, filed on Dec. 9, 2015, the disclosure of which is hereby incorporated by reference.

STATEMENT REGARDING FEDERALLY SPONSORED RESEARCH

This invention was made with government support under awards N00014-15-1-2400 and N00014-13-1-0430 awarded by the Office of Naval Research. The government has certain rights in the invention.

FIELD OF THE DISCLOSURE

The disclosure generally relates to transition metal oxide and silicon oxide xerogels. More particularly, the disclosure relates to use of transition metal oxide and silicon oxide xerogels as antifouling coatings.

BACKGROUND OF THE DISCLOSURE

Marine biofouling is a problem for the shipping industry that currently lacks an economically viable solution. Biofouling leads to an increase in roughness and drag on ship hulls with subsequent loss of range and speed. Fuel consumption may account for up to 60% of a ship's operating costs and may increase by up to 40% in just six months on a ship without any treatment to minimize fouling. Escalation in the production of greenhouse gasses (through increased fuel consumption), corrosion, and the onset of cavitation also result from marine biofouling.

Antifouling (AF) paints containing metal complexes and/or biocides are currently used to combat marine biofouling, but raise concerns for environmental damage through leaching of metals or biocides. The recent development of fouling-release (FR) coatings to facilitate the removal of fouling organisms via water flow or cleaning, provide a more environmentally benign approach to reduce the effects of biofouling. FR technology largely relies on the use of silicone elastomers with low surface energy and modulus, properties that favor the release of fouling organisms. The use of FR coatings to combat biofouling on immersed surfaces is limited by the fact that fouling is removed only in the presence of hydrodynamic shear or through regular cleaning.

Coatings with the ability to generate materials in situ either to discourage settlement or to minimize adhesion of biofouling organisms from reagents naturally present in seawater would be one approach to combine the benefits of both AF and FR technologies. The production of hypohalous acids from the oxidation of halide salts with $H_2O_2$ found in the aquatic environment can produce hypohalous acids in situ. The hypohalous acids have known biocidal effects and have been shown to discourage settlement of some species when generated in situ. Hydrogen peroxide thermodynamically can oxidize chloride, bromide, and iodide, although for chloride and bromide, these reactions are kinetically slow.

Hydrogen peroxide is found in the open ocean at concentrations up to $2 \times 10^{-7}$ M and can approach $5 \times 10^{-5}$ M in ports fed by rain water or by runoff. Hydrogen peroxide is also formed by photochemical decomposition of organic matter near the water surface and can be produced by bacteria in the biofilm on submerged surfaces, approaching concentrations of $5 \times 10^{-5}$ M. The ambient $H_2O_2$ can react with chloride (0.5 M), bromide ($10^{-3}$ M), and iodide ($10^{-6}$ M) present in seawater to produce low concentrations of hypohalous acid. The AF characteristics of a coating can be increased through the use of a coating-sequestered catalyst to activate $H_2O_2$ to increase the production of hypohalous acids at the surface to produce negative settlement cues to marine fouling organisms.

Sol-gel-derived xerogel coatings based on amorphous silica have shown promise as FR coatings and have been modified to incorporate organochalcogenide catalysts for the activation of $H_2O_2$. While they have shown some promise as AF coatings, the FR characteristics of the surface are modified by the presence of the organochalcogen catalyst and may actually decrease fouling release. If the catalytic site for activation of $H_2O_2$ were part of the inorganic matrix of the xerogel, then the AF properties might not compromise the FR properties.

The grafting of transition metals to mesoporous silica has provided an array of catalysts for the oxidation of halide salts with $H_2O_2$. Oxidation of chloride with titanium grafted onto mesoporous silica was observed at pH 4 but not at pH 6.5 or higher while oxidation of bromide with $H_2O_2$ was observed over the pH range 4-8. Oxidation of bromide with $H_2O_2$ has been observed with several grafted metals on silica in the reactivity order W>Mo>Ti>Zr>V>Re. While the grafting of transition metals onto mesoporous silica is not a practical approach for AF/FR coatings covering large surface areas.

SUMMARY OF THE DISCLOSURE

The present disclosure provides xerogels, their manufacture via the sol-gel process and methods of applying the xerogels to form coatings. The present disclosure also provides uses of the xerogels.

The xerogels of the present disclosure incorporate, for example, titanium tetraisopropoxide (TTIP) or other transition metal alkoxides [such as, but not limited to, titanium tetraisopropoxide (TTIP), oxovanadium triisopropoxide (VOTIP), molybdenum pentaisopropoxide (MoPIP), or tungsten pentaisopropoxide (WPIP)] and/or transition metal oxides [such as, but not limited to, vanadium oxide ($V_2O_5$)] as part of the inorganic matrix.

In an aspect, the present disclosure provides xerogels and compositions comprising xerogels. The xerogels and compositions of the present disclosure can be made by methods disclosed herein. The xerogels and compositions of the present disclosure can be made by methods disclosed herein. In various examples, a xerogel or a composition comprising a xerogel is made by a method of the present disclosure.

The xerogels and compositions comprising xerogels can be in the form of thin films (e.g., surface coatings), monoliths, or powders. The thickness of the xerogel thin films (e.g., surface coatings) can be varied based on the deposition method and/or parameters of the deposition process (e.g., concentrations of the precursor components). For example, the film can have a thickness of 1 micron to 20 microns, including all integer thickness values and ranges therebetween.

In an aspect, the present disclosure provides methods of providing a thin film xerogel coating on a surface. This disclosure also provides methods of applying said xerogels to surfaces to form coatings on said surfaces. Applicable surfaces include, but are not limited to, ship hulls or the exterior surfaces of other marine vessels, such as submarines. Xerogels may be applied, for example, by brushing, rolling, spraying, dip coating or spin coating. Dip coating or spin coating are particularly useful for smaller surfaces (see FIG. 1).

Generally, the precursor composition (referred to herein as a sol) is formed by combining sol-gel precursor components described herein (e.g., sol-gel components such as, for example, one or more transition metal alkoxide precursor and/or transition metal oxide and one or more tetraalkoxysilane) and allowing the components to stand for a period of time such that a desired amount of hydrolysis and polymerization of the precursors occurs. This precursor composition can be coated on a surface and surface allowed to stand for a period of time such that a xerogel film having is formed. The determination of specific reaction conditions (e.g., mixing times, standing times, acid/base concentration, solvent(s)) for forming the xerogel film is within the purview of one having skill in the art.

In an aspect, the present disclosure provides uses of the xerogels and compositions comprising xerogel of the present disclosure. The xerogels of the present disclosure are particularly useful as xerogel coatings on surfaces. In the presence of hydrogen peroxide in artificial seawater, the transition-metal-containing xerogels have AF and/or FR characteristics toward zoospores and sporelings of the marine alga Ulva linza that are not observed in transition-metal-free xerogels. The characterization of the mixed transition metal oxide/silica xerogel surfaces by contact-angle analysis, scanning electron microscopy (SEM), and X-ray photoelectron spectroscopy (XPS) is also described. Importantly, for example, Ti-containing xerogels (and other transition metal-containing xerogels) catalyze the oxidation of both chloride and bromide with $H_2O_2$ to produce the corresponding hypohalous acids.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
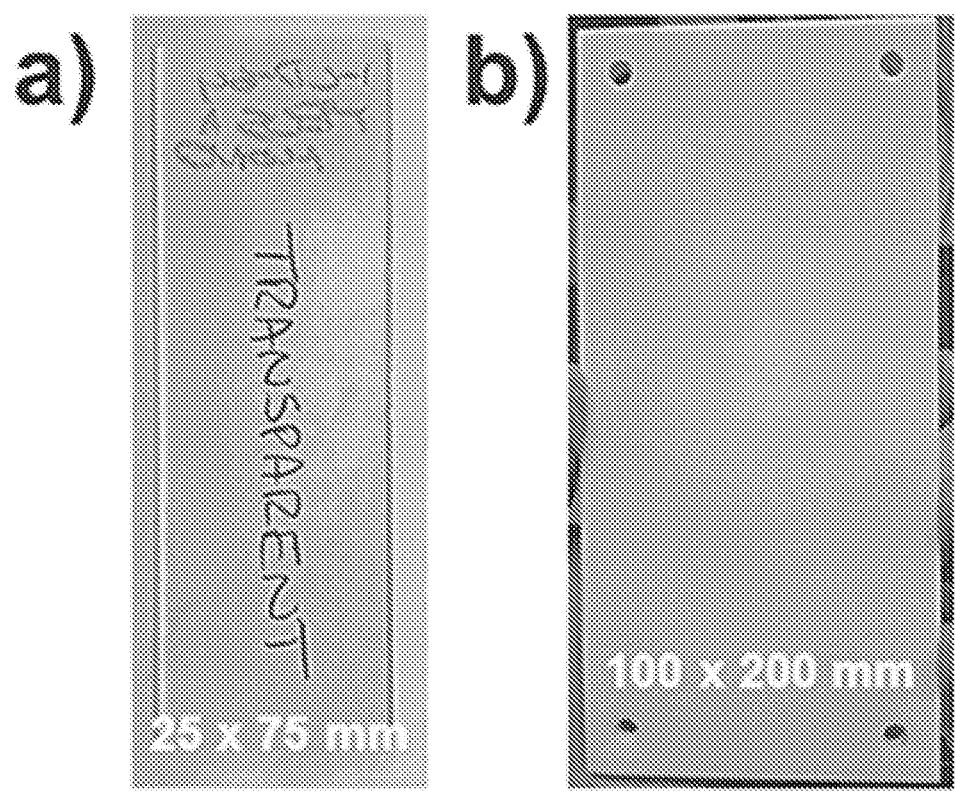
FIG. 1 shows the appearance of 20:40:40 TTIP/C8/TEOS xerogels a) spin-coated on borosilicate glass slides and b) dip-coated on 100 mm×200 mm epoxy-primed fiberglass panels.

Although claimed subject matter will be described in terms of certain embodiments, other embodiments, including embodiments that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

As used herein, unless otherwise stated, the term "group" refers to a chemical entity that has one terminus that can be covalently bonded to other chemical species. Examples of groups include, but are not limited to:

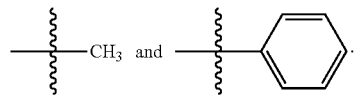

As used herein, unless otherwise indicated, the term "alkyl" refers to branched or unbranched saturated hydrocarbon groups. Examples of alkyl groups include, but are not limited to, methyl groups, ethyl groups, propyl groups, butyl groups, isopropyl groups, tert-butyl groups, and the like. For example, the alkyl group can be a $C_1$ to $C_{12}$, including all integer numbers of carbons and ranges of numbers of carbons therebetween, alkyl group. The alkyl group can be unsubstituted or substituted with one or more substituent. Examples of substituents include, but are not limited to, various substituents such as, for example, halogens (—F, —Cl, —Br, and —I), aliphatic groups (e.g., alkyl groups, alkenyl groups, and alkynl groups), aryl groups, alkoxide groups, carboxylate groups, carboxylic acids, ether groups, and the like, and combinations thereof.

As used herein, unless otherwise indicated, the term "alkoxy" refers to —OR groups, where R is an alkyl group as defined herein. Examples of alkyoxy groups include, but are not limited to, methoxy groups, ethoxy groups, n-propoxy groups, i-propoxy groups, n-butoxy groups, i-butoxy groups, s-butoxy groups, and the like.

As used herein, unless otherwise indicated, the term "aminoalkyl" refers to —R—NH$_2$ groups, where R is an alkyl group as defined herein.

As used herein, unless otherwise indicated, the term "alkylamino" refers to —NHR groups, where R is an alkyl group as defined herein.

As used herein, unless otherwise indicated, the term "dialkylamino" refers to —NRR', where R and R' are independently selected alkyl groups as described herein.

As used herein, unless otherwise indicated, the term "alkylaminoalkyl" refers to

where R is an alkyl group as defined herein and R' is an alkyl group as defined herein.

As used herein, unless otherwise indicated, the term "dialkylaminoalkyl" refers to

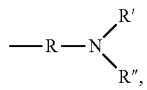

where R is an alkyl group as define herein and R' and R" are independently selected from alkyl groups as defined herein.

As used herein, unless otherwise indicated, the term "transition metal" refers to an element whose atom has a partially filled d subshell, or which can give rise to cations with an incomplete d sub-shell (elements in the d block of the periodic table). Examples of transition metals include elements from groups 3 to 11 on the periodic table, where the term group refers to a column on the periodic table. For example, a transition metal is titanium, vanadium, molybdenum, tungsten, or any other element from the d block on the period table.

As used herein, unless otherwise indicated, the term "transition metal alkoxide" refers to M(OR)$_n$, where M is a transition metal as defined herein, where OR is an alkoxy group as defined herein, and where n=1 to 5, including all integer numbers therebetween.

As used herein, unless otherwise indicated, the term "alkyltrialkoxysilane" refers to

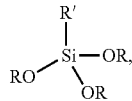

where R' is an alkyl group as described herein and R is an alkyl group of an alkoxy group as described herein. The R groups of the alkoxy groups may be the same or different. Examples of suitable alkyltrialkoxysilanes include, but are not limited to, n-dodecyltriethoxysilane, n-octadecyltriethoxysilane, n-decyltriethoxysilane, n-propyltrimethoxy silane, n-butyltriethoxysilane, n-pentyltriethoxysilane, n-hexyltriethoxysilane, n-heptyltriethoxysilane, n-octyltriethoxysilane, and branched alkyl analogues thereof.

As used herein, unless otherwise indicated, the term "aminoalkyltrialkoxysilane" refers to

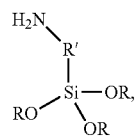

where R' is an alkyl group as an aminoalkyl group as described herein and R is the alkyl group of an alkoxy group as described herein. The R groups of the alkoxy groups may be the same or different. Examples of suitable aminoalkyltrialkyoxysilanes include, but are not limited to, aminomethyltriethoxysilane, aminoethyltriethoxysilane, aminopropyltriethoxysilane, aminobutyltriethoxysilane, aminopentyltriethoxysilane, and aminohexyltriethoxysilane.

As used herein, unless otherwise indicated, the term "alkylaminoalkyltrialkoxysilane" refers to

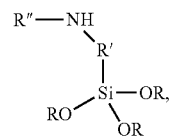

where R" is an alkyl group of an alkylamino group as described herein, R' is an alkyl group of an alkylaminoalkyl group as described herein, and R is the alkyl group of an alkoxy group as described herein. The R groups of the alkoxy groups may be the same or different. Examples of suitable alkylaminoalkyltrialkoxysilanes include, but are not limited to, methylaminoethyltriethoxysilane, methylaminopropyltriethoxysilane, methylaminobutyltriethoxysilane, methylaminopentyltriethoxysilane, methylaminohexyltriethoxysilane, and ethyl and propyl amino analogues thereof.

As used herein, unless otherwise indicated, the term "dialkylaminoalkyltrialkoxysilane" refers to

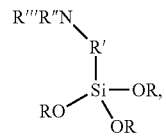

where R" and R'" are independently selected from alkyl groups of an diaminoalkyl group described herein, R' is an alkyl group of a dialkylaminoalkyl group as described herein, and R is the alkyl group of an alkoxy group as described herein. The R groups of the alkoxy groups may be the same or different. Examples of dialkylaminoalkyltrialkoxysilanes include, but are not limited to, dimethylaminoethyltriethoxysilane, dimethylaminopropyltriethoxysilane, dimethylaminobutyltriethoxysilane, dimethylaminopentyltriethoxysilane, dimethylaminohexyltriethoxysilane, and diethylamino and dipropylamino analogues thereof.

As used herein, unless otherwise indicated, the term "tetraalkoxysilane" refers to

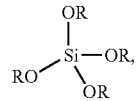

where R is an alkyl group of an alkoxy group as described herein. The R groups of the alkoxy groups may be the same or different. Examples of suitable tetraalkoxysilanes include, but are not limited to, tetramethoxysilane, tetraethoxysilane, and tetraisopropoxysilane.

The present disclosure provides xerogels, their manufacture via the sol-gel process and methods of applying the xerogels to form coatings. The present disclosure also provides uses of the xerogels.

The xerogels of the present disclosure incorporate, for example, titanium tetraisopropoxide (TTIP) or other transition metal alkoxides [such as, but not limited to, titanium tetraisopropoxide (TTIP), oxovanadium triisopropoxide (VOTIP), molybdenum pentaisopropoxide (MoPIP), or tungsten pentaisopropoxide (WPIP)] and/or transition metal oxides [such as, but not limited to, vanadium oxide ($V_2O_5$)] as part of the inorganic matrix.

In an aspect, the present disclosure provides xerogels and compositions comprising xerogels. The xerogels and compositions of the present disclosure can be made by methods disclosed herein. In an example, the transition metals present in the xerogel or composition comprising a xerogel are not only or are not grafted on a surface of the xerogel or composition. The xerogels and compositions of the present disclosure can be made by methods disclosed herein. In various examples, a xerogel or a composition comprising a xerogel is made by a method of the present disclosure.

One embodiment of the transition metal oxide/silica xerogel incorporates 0.25 mole-% to 50 mole-% of a transition metal alkoxide precursor [such as, but not limited to, titanium tetraisopropoxide (TTIP), oxovanadium triisopropoxide (VOTIP), or tungsten pentaisopropoxide (WPIP)] and/or a transition metal oxide [such as, but not limited to, vanadium oxide ($V_2O_5$)] in combination with 50 to 99.75 mole-% of a tetraalkoxysilane such as tetramethoxysilane (TMOS), tetraethoxysilane (TEOS), or tetraisopropoxysilane (TIPOS). A second embodiment of the invention incorporates 0.25 mole-% to 25 mole-% of a transition metal alkoxide precursor [such as, but not limited to, titanium tetraisopropoxide (TTIP), oxovanadium triisopropoxide (VOTIP), molybdenum pentaisopropoxide (MoPIP), or tungsten pentaisopropoxide (WPIP)] and/or a transition metal oxide [such as, but not limited to, vanadium oxide ($V_2O_5$)] in combination with 10 mole-% to 55 mole-% of a shorter-chain alkyltrialkoxysilane [such as, but not limited to, n-propyltrimethoxysilane (C3), n-octyltriethoxysilane (C8), or n-dodecyltriethoxysilane (C12)] and 45 mole-% to 90 mole-% of a tetraalkoxysilane [such as, but not limited to, tetramethoxysilane (TMOS), tetraethoxysilane (TEOS), or tetraisopropoxysilane (TIPOS)]. A third embodiment of the invention incorporates 0.25 mole-% to 25 mole-% of a transition metal alkoxide precursor [such as, but not limited to, titanium tetraisopropoxide (TTIP), oxovanadium triisopropoxide (VOTIP), molybdenum pentaisopropoxide (MoPIP), or tungsten pentaisopropoxide (WPIP)] and/or a transition metal oxide [such as, but not limited to, vanadium oxide ($V_2O_5$)] in combination with 10 mole-% to 55 mole-% of an aminoalkyl-, alkylaminoalkyl-, or dialkylaminoalkyl-trialkoxysilane [such as, but not limited to, aminopropyltriethoxysilane (AP or APTES), methylaminopropyltriethoxysilane (MAP), or dimethylaminopropyltriethoxysilane (DMAP)] in combination and 45 mole-% to 90 mole-% of a tetraalkoxysilane [such as, but not limited to, tetramethoxysilane (TMOS), tetraethoxysilane (TEOS), or tetraisopropoxysilane (TIPOS)].

The xerogels and compositions comprising xerogels can be in the form of thin films (e.g., surface coatings), monoliths, or powders. The thickness of the xerogel thin films (e.g., surface coatings) can be varied based on the deposition method and/or parameters of the deposition process (e.g., concentrations of the precursor components). For example, the film can have a thickness of 1 micron to 20 microns, including all integer thickness values and ranges therebetween.

The xerogels and compositions comprising xerogels (e.g., xerogel thin films) have desirable properties. For example, the xerogels and compositions comprising xerogels have desirable wetting properties (which can be measured by, for example, contact angle) and surface roughness. In various examples, the contact angle (water) of the thin film is greater than 90 degrees, greater than 95 degrees or greater than 100 degrees. For example, the contact angle of the thin film is between 90 and 150 degrees, including all integer degree values and ranges thereof. For example, the surface roughness of the thin film is greater than 1 nm. For example, the surface roughness is between 1 and 20 nm, including all values to the nm and ranges thereof.

In an example, xerogels and compositions comprising xerogels (e.g., xerogel thin films) comprises a sol-gel matrix made by a method described herein (e.g., a method comprising the following steps: forming a precursor composition comprising sol-gel precursor components such as, for example, one or more transition metal alkoxide precursor and/or transition metal oxide and one or more tetraalkoxysilane, and coating the precursor composition on a surface such that a sol-gel matrix film is formed on the surface).

In an aspect, the present disclosure provides methods of providing a thin film xerogel coating on a surface. This disclosure also provides methods of applying said xerogels to surfaces to form coatings on said surfaces. Applicable surfaces include, but are not limited to, ship hulls or the exterior surfaces of other marine vessels, such as submarines. Xerogels may be applied, for example, by brushing, rolling, spraying, dip coating or spin coating. Dip coating or spin coating are particularly useful for smaller surfaces (see FIG. 1).

The xerogels and compositions comprising xerogels (e.g., xerogel thin films) can be formed by acid-catalyzed hydrolysis and polymerization of the sol-gel precursor components. In an example, the sol-gel precursor composition further comprises an acidic component that makes the pH of the composition sufficiently acidic so that the components undergo acid-catalyzed hydrolysis to form the sol-gel matrix. Examples of suitable acidic components include, but are not limited to, aqueous acids such as hydrochloric acid, hydrobromic acid, and trifluoroacetic acid. Conditions and components required for acid-based hydrolysis of sol-gel components are known in the art.

Generally, the precursor composition (referred to herein as a sol) is formed by combining sol-gel precursor components described herein (e.g., sol-gel components such as, for example, one or more transition metal alkoxide precursor and/or transition metal oxide and one or more tetraalkoxysilane) and allowing the components to stand for a period of time such that a desired amount of hydrolysis and polymerization of the precursors occurs. This precursor composition can be coated on a surface and surface allowed to stand for a period of time such that a xerogel film having is formed. The determination of specific reaction conditions (e.g., mixing times, standing times, acid/base concentration, solvent(s)) for forming the xerogel film is within the purview of one having skill in the art.

After applying the coating of the sol-gel precursor composition or sol formed from the sol-gel precursor composition, the coating is allowed to stand for a time sufficient to form the sol-gel matrix. Depending on the thickness of the coating, the standing time is, for example, from 1 hour to 72 hours, including all integer numbers of hours and ranges therebetween.

In an aspect, the present disclosure provides uses of the xerogels and compositions comprising xerogel of the present disclosure. For example, the xerogels and compositions can be used as antifouling/fouling release (AF/FR) surfaces.

The xerogels of the present disclosure are particularly useful as xerogel coatings on surfaces. In the presence of hydrogen peroxide in artificial seawater, the transition-metal-containing xerogels have AF/FR characteristics toward zoospores and sporelings of the marine alga Ulva linza that are not observed in transition-metal-free xerogels. The characterization of the mixed transition metal oxide/silica xerogel surfaces by contact-angle analysis, scanning electron microscopy (SEM), and X-ray photoelectron spectroscopy (XPS) is also described. Importantly, for example, Ti-containing xerogels (and other transition metal-containing xerogels) catalyze the oxidation of both chloride and bromide with $H_2O_2$ to produce the corresponding hypohalous acids.

Biofoulants are organisms that attach and grow on surfaces in aqueous environments. Examples of biofoulants include, but are not limited to, algae, diatoms, bacteria, barnacles, biofilms, and the like.

Aqueous environments are any aqueous media in which biofoulants are, or may be, present. Examples of such aqueous environments include, but are not limited to, freshwater and saltwater environments and the like. The aqueous environments can be naturally occurring or man made. Examples of aqueous environments include, but are not limited to, rivers, lakes, oceans, and the like. Additional examples of aqueous environments include, but are not limited to, tanks of freshwater or saltwater and the like.

The surface is any surface that can be contacted with an aqueous environment. The surfaces can be materials such as, for example, metals (such as marine grade aluminum), plastics, composites (such as fiberglass), glass, wood, or other natural fibers. Examples of suitable surfaces include, but are not limited to, surfaces of a water-borne vessels such as boats, ships, personal watercraft, surfaces of devices such as optics (e.g., underwater cameras), sensors (e.g., marine sensors), submersible solar panels, and related applications. Another example of a surface is the surface of a monitoring system of an underwater archaeological site.

The xerogels or compositions comprising xerogels of the present disclosure can function as antifouling surfaces and/or fouling release surfaces. The xerogels or compositions can react with peroxide (e.g., peroxide present in the aqueous environment or added peroxide) (e.g., activate peroxide) and/or can react with light and oxygen (e.g., oxygen present in the aqueous environment or added peroxide) to generate reactive oxygen species. The reaction with peroxide and/or generation of reactive oxygen species can prevent fouling and/or reduce fouling of a xerogel surface or surface of a composition comprising a xerogel.

By preventing fouling it is meant that the attachment or growth of organisms on the xerogel or composition comprising the xerogel is completely eliminated (i.e., no growth or attachment is detectable by methods, such as optical or fluorescence methods known in the art). By reducing fouling it is meant that the attachment or growth of organisms is reduced by more than 70%, 80%, 90%, 95%, 96%, 97%, 98%, or 99%. For example, the reduction in fouling (e.g., fouling rating) can be measured by determining difference in the amount of biofoulant (e.g., the number of settled organisms) on xerogel coated and uncoated surfaces under the same conditions by optical or fluorescence methods. As another example, the reduction in fouling (e.g., fouling release) is determined by the difference in water pressure required to remove biofoulant (e.g., settled organisms) from a xerogel coated and non-xerogel coated surface under the same conditions.

Various examples of the compositions and methods of the present disclosure are provided in the following Statements:

Statement 1. A composition comprising a transition metal oxide and silicon oxide xerogel matrix disclosed herein, where the xerogel matrix is formed from a sol-gel composition as described herein (e.g., comprising: 25 mole % to 50 mole %, including all integer mol % values and ranges therebetween, of a transition metal alkoxide or transition metal oxide, and 50 to 99.75 mole %, including all integer mol % values and ranges therebetween, of a tetraalkoxysilane).

Statement 2. A composition comprising a transition metal oxide and silicon oxide xerogel matrix disclosed herein, where the xerogel matrix is formed from a sol-gel composition as described herein (e.g., comprising: 0.25 mole % to 25 mole %, including all integer mol % values and ranges therebetween, of a transition metal alkoxide, and 45 mole % to 90 mole %, including all integer mol % values and ranges therebetween, of a tetraalkoxysilane, and where the sol-gel composition further comprises: 10 mole % to 55 mole %, including all integer mol % values and ranges therebetween, of a shorter-chain alkyltrialkoxysilane or 10 mole % to 55 mole %, including all integer mol % values and ranges therebetween, of an aminoalkyl-, alkylaminoalkyl-, or dialkylaminoalkyltrialkoxysilane).

Statement 3. A composition according to Statement 1 or 2, wherein the transition metal alkoxide is selected from the group consisting of titanium tetraisopropoxide (TTIP), oxovanadium triisopropoxide (VOTIP), or tungsten pentaisopropoxide (WPIP), and combinations thereof and/or the transition metal oxide is vanadium oxide.

Statement 4. A composition according any one of Statements 1 to 3, where the tetraalkoxysilane is selected from the group consisting of tetramethoxysilane (TMOS), tetraethoxysilane (TEOS), or tetraisopropoxysilane (TIPOS), and combinations thereof.

Statement 5. A composition according to any one Statements 2 to 4, where the alkyltrialkoxysilane is selected from the group consisting of $C_3$ to $C_{12}$ alkyltrialkoxysilanes and combinations thereof (e.g., n-propyltrimethoxysilane (C3), n-octyltriethoxysilane (C8), or n-dodecyltriethoxysilane (C12), and combinations thereof).

Statement 6. A composition according to any one Statements 2 to 4, wherein the aminoalkyl-, alkylaminoalkyl-, or dialkylaminoalkyltrialkoxysilane is selected from the group consisting of aminopropyltriethoxysilane (AP or APTES), methylaminopropyltriethoxysilane (MAP), or dimethylaminopropyltriethoxysilane (DMAP), and combinations thereof.

Statement 7. A composition according to any one of the preceding Statements, where the composition is a thin film (e.g., a thin film having a thickness of 1 to 20 microns, including all values to 0.1 micron and ranges therebetween), monolith, or powder.

Statement 8. A composition according to Statement 7, where the thin film is disposed on a surface described herein (e.g., a surface selected from the group consisting of woods, plastics, glasses, metals, and combinations thereof).

Statement 9. A method of providing a thin film xerogel coating on a surface disclosed herein comprising: applying (e.g., by brushing, rolling, spraying, dip coating, or spin coating) a sol-gel composition as described herein (e.g., comprising: i) 25 mole % to 50 mole %, including all integer mol % values and ranges therebetween, of a transition metal alkoxide and/or a transition metal oxide, and 50 to 99.75 mole %, including all integer mol % values and ranges therebetween, of a tetraalkoxysilane, or ii) 0.25 mole % to 25 mole %, including all integer mol % values and ranges therebetween, of a transition metal alkoxide and/or a transition metal oxide, 45 mole % to 90 mole %, including all integer mol % values and ranges therebetween, of a tetraalkoxysilane, and 10 mole % to 55 mole %, including all integer mol values and ranges therebetween, of a shorter-chain alkyltrialkoxysilane, or iii) 0.25 mole % to 25 mole %, including all integer mol % values and ranges therebetween, of a transition metal alkoxide and/or a transition metal oxide, 45 mole % to 90 mole %, including all integer mol % values and ranges therebetween, of a tetraalkoxysilane, and 10 mole % to 55 mole %, including all integer mol % values and ranges therebetween, of an aminoalkyl-, alkylaminoalkyl-, or dialkylaminoalkyltrialkoxysilane to the surface such that the thin film xerogel coating is formed on the surface.

Statement 10. A method according to Statement 9, where the thin film xerogel coating has a thickness of 1 to 20 microns.

Statement 11. A method according to Statement 8 or 9, where the film has a contact angle as described herein (e.g., a contact angle in water of greater than 90 degrees).

Statement 12. A method according to any one of Statements 8 to 10, where the thin film xerogel coating has a surface roughness as described herein (e.g. a surface roughness of greater than 1 nm).

Statement 13. A method according to any one of Statements 8 to 11, where the surface selected from the group consisting of woods, plastics, glasses, metals, and combinations thereof.

Statement 14. A method of using a surface susceptible to fouling in an aqueous environment as disclosed herein (e.g., a method comprising: applying (e.g., by brushing, rolling, spraying, dip coating, or spin coating) a sol-gel composition comprising: i) 25 mole % to 50 mole % of a transition metal alkoxide and/or transition metal oxide, and 50 to 99.75 mole % of a tetraalkoxysilane, or ii) 0.25 mole % to 25 mole % of a transition metal alkoxide and/or transition metal oxide, 45 mole % to 90 mole % of a tetraalkoxysilane, and 10 mole % to 55 mole % of a shorter-chain alkyltrialkoxysilane, or iii) 0.25 mole % to 25 mole % of a transition metal alkoxide and/or a transition metal oxide, 45 mole % to 90 mole % of a tetraalkoxysilane, and 10 mole % to 55 mole % of an aminoalkyl-, alkylaminoalkyl-, or dialkylaminoalkyltrialkoxysilane, to the surface such that the thin film xerogel coating is formed on the surface, and exposing the thin film xerogel coated surface to an aqueous environment, where the thin film xerogel coated surface exhibits reduced fouling as described herein (e.g., reduced fouling relative to a same surface that is not coated with the thin film xerogel coating) or non-observable (e.g., no visible fouling or no observable fouling using optical or fluorescence methods) fouling after contact with the aqueous environment (e.g., no observable fouling after 1 day, 5 days, 10 days, or 30 days)).

Statement 15. A method according to Statement 14, where the surface selected from the group consisting of woods, plastics, glasses, metals, and combinations thereof.

Statement 16. A method according to Statement 14 or 15, where the aqueous environment is naturally occurring or man-made and is fresh water or salt water.

Statement 17. A method according to any one of Statements 14 to 16, where the aqueous environment is a marine environment.

The following examples are presented to illustrate the present disclosure. They are not intended to limiting in any matter.

EXAMPLE 1

This example provides a description of making and characterizing mixed transition metal oxide silica xerogels of the present disclosure.

Chemicals, Reagents, and Materials—Deionized (DI) water was prepared to a specific resistivity of at least 18 MΩ using a Barnstead NANOpure Diamond UV ultrapure water system. Tetraethoxysilane (TEOS) and n-octyltriethoxysilane (C8) were purchased from Gelest, Inc. and were used as received. Ethanol was purchased from Decon Laboratories. Hydrochloric acid, 2-propanol, and 30% hydrogen peroxide were obtained from Fisher Scientific Co. Titanium tetraisopropoxide (TTIP) and 4-pentenoic acid were obtained from Acros Organics and were used as received. Deuterium oxide (>99%) was obtained from Cambridge Isotopes. Borosilicate glass microscope slides were obtained from Fisher Scientific, Inc.

The artificial seawater (ASW) used in this study was prepared via a modification of the Marine Biological Laboratory (Woods Hole, Mass., USA) recipe [Biological Bulletin Compendia. [http://hermes.mbl.edu/BiologicalBulletin/COMPENDIUM/CompTab3.html#3A]. In addition to the salts used in the MBL recipe, 1.0 mM of sodium bromide and 1.0 μM of sodium iodide were added to give a more realistic representation of the halide ions present in natural seawater.

Xerogel composition—TEOS—xerogel monoliths were prepared at room temperature. A TEOS monolith was prepared by mixing TEOS (10.0 mmol, 2.23 ml) and EtOH (10.4 mmol, 607 μl) in a glass vial while stirring. Water (13.5 mmol, 244 μl) and HCl (24.6 μl of a 1.0 M solution) were combined in a separate vial and added dropwise to the reaction mixture with stirring. Following addition of acid, the monolith was left stirring open to the atmosphere at ambient temperature until gel formation was observed and all solvent had evaporated. The xerogel was then dried under reduced pressure for 48 h at ambient temperature, then crushed using mortar and pestle.

Xerogel composition—20:80 TTIP/TEOS—the 20:80 TTIP/TEOS monolith was prepared following the TEOS protocol using TTIP (2.00 mmol, 0.592 ml) and TEOS (8.00 mmol, 1.79 ml) in the initial step.

Xerogel composition—40:60 C8/TEOS—the 40:60 C8/TEOS monolith was prepared following the TEOS protocol using C8 (4.00 mmol, 1.26 ml) and TEOS (6.00 mmol, 1.34 ml).

Xerogel composition—20:40:40 TTIP/C8/TEOS—the 20:40:40 TTIP/C8/TEOS monolith was prepared following the TEOS protocol using TTIP (2.00 mmol, 0.592 ml), C8 (4.00 mmol, 1.26 ml) and TEOS (4.00 mmol, 893 μl).

Xerogel composition—1% $V_2O_5$ in TEOS—TEOS (6.70 mL, 30.0 mmol) was added to stirring EtOH (4.55 mL, 78.0 mmol). Water (1.83 mL, 101.4 mmol) and HCl (12.1 M, 15.4 μl, 185 μmol) were combined in a separate vial and added dropwise to the reaction medium while stirring. $V_2O_5$ (54.5 mg, 300 μmol) was added and the solution allowed to stir until gel formation was observed.

Xerogel composition—1% $V_2O_5$ in 1:99 AP/TEOS—the AP (46.8 μL, 200 μmol) and TEOS (4.42 mL, 19.8 mmol)

were added to stirring EtOH (3.04 mL, 52.0 mmol). Water (1.22 mL, 67.6 mmol) and HCl (12.1 M, 10.3 µl, 123 µmol) were combined in a separate vial and added dropwise to the reaction medium while stirring. Solid $V_2O_5$ (36.4 mg, 200 µmol) was added and the solution allowed to stir until gel formation was observed.

Xerogel composition—1% $V_2O_5$ in 10:90 C12/TEOS—the C12 (650 µL, 2.00 mmol) and TEOS (4.02 mL, 18.0 mmol) were added to stirring EtOH (3.04 mL, 52.0 mmol). Water (1.22 mL, 67.6 mmol) and HCl (12.1 M, 10.3 µl, 123 µmol) were combined in a separate vial and added dropwise to the reaction medium while stirring. The $V_2O_5$ (36.4 mg, 200 µmol) was added and the solution allowed to stir until gel formation was observed.

Xerogel composition—1% $V_2O_5$, 1% PEG in TEOS—polyethyleneglycol (PEG, 670 mg, 200 µmol) was added to stirring EtOH (3.04 mL, 52.0 mmol). Once dissolved, TEOS (4.02 mL, 18.0 mmol) was added. Water (1.22 mL, 67.6 mmol) and HCl (12.1 M, 10.3 µl, 123 µmol) were combined in a separate vial and added dropwise to the reaction medium while stirring. The $V_2O_5$ (36.4 mg, 200 µmol) was added and the solution allowed to stir until gel formation was observed.

Xerogel composition—1% $NH_4VO_3$ in TEOS—the $NH_4VO_3$ (23.4 mg, 200 µmol) was dissolved in $H_2C_2O_4$ (1.0 M, 2.00 mL, 2.00 mmol). Ethanol (3.04 mL, 52.0 mmol) and TEOS (4.46 mL, 20.0 mmol) were added to the stirring solution. Water (1.22 mL, 67.6 mmol) and HCl (12.1 M, 10.3 µl, 123 µmol) were combined in a separate vial and added dropwise to the reaction medium while stirring and the sol allowed to stir until gel formation was observed.

Xerogel composition—1% $Na_3VO_4$ in TEOS—the 1% $Na_3VO_4$ in TEOS was prepared as 1% $NH_4VO_3$ in TEOS, substituting $Na_3VO_4$ (36.8 mg, 200 µmol) for $NH_4VO_3$.

Xerogel composition—20% TTIP in VTIP—a 6 wt % solution of VOTIP (590 µL, 2.50 mmol) in iPrOH (12.9 mL) was prepared in a flame-dried vial and stirred. Next, TTIP (153 µL, 500 µmol) was added to the solution. A 10 wt % solution of $H_2O$ (45.0 µL, 2.50 mmol) in iPrOH (574 µL) and a 5 wt % solution of $CH_3COOH$ (71.6 µL, 1.25 mmol) in iPrOH (1.91 mL) were prepared and combined, then added dropwise to the solution while stirring.

Sols for spin coating were prepared at ambient temperature. A TEOS sol was prepared from $H_2O$ (8.00 mmol, 144 µl) and acetic acid (4.00 mmol, 229 µl) in isopropanol (7.96 mL) and adding this solution dropwise to stirring TEOS (4.46 mL, 20.0 mmol). The resulting sol was capped and stirred for 24 h prior to coating. The 20:80 TTIP/TEOS sol was prepared following the TEOS protocol using TTIP (4.00 mmol, 1.18 ml) and TEOS (16.0 mmol, 3.57 ml). The 40:60 C8/TEOS sol was prepared following the TEOS protocol using C8 (8.00 mmol, 2.53 ml) and TEOS (12.0 mmol, 2.68 ml). The 20:40:40 TTIP/C8/TEOS sol was prepared following the TEOS protocol using TTIP (4.00 mmol, 1.18 ml), C8 (8.00 mmol, 2.53 ml), and TEOS (8.00 mmol, 1.79 ml).

Xerogel composition—40:20:40 TTIP/C8/TEOS—the 40:20:40 TTIP/C8/TEOS monolith was prepared following the TEOS protocol using TTIP (4.00 mmol, 1.18 ml), C8 (2.00 mmol, 0.63 ml) and TEOS (4.00 mmol, 893 µl).

Xerogel composition—50:50 TTIP/TEOS—the 50:50 TTIP/TEOS monolith was prepared following the TEOS protocol using TTIP (5.00 mmol, 1.48 mL) and TEOS (5.00 mmol, 1.12 ml) in the initial step.

Xerogel composition—50:50 MoPIP/TEOS—the 50:50 MoPIP/TEOS monolith was prepared following the TEOS protocol using MoPIP (5.00 mmol, 1.48 ml) and TEOS (5.00 mmol, 1.12 ml) in the initial step.

Xerogel composition—20:40:40 APTES/TTIP/TEOS—TEOS (4.00 mmol, 0.894 ml), TTIP (4.00 mmol, 1.18 ml), APTES (2.00 mmol, 0.468 ml) and EtOH (10.4 mmol, 608 µl) were combined in a glass vial while stirring. $H_2O$ (13.5 mmol, 0.244 ml) and HCl (1.0 M, 290 µmol, 25 µl) were combined in a separate vial and added dropwise to the reaction medium while stirring. Following addition of acid, the monolith was left stirring open to atmosphere at ambient temperature until gel formation was observed and all solvent had evaporated. Xerogels were then dried under reduced pressure for 48 h. Following drying, the xerogel monolith was crushed using mortar and pestle.

Xerogel films—xerogel films were formed as described by Bennett et al. (2010) by spin-casting 400 µl of the sol precursor onto pre-cleaned 25 mm×75 mm glass microscope slides. Slides were cleaned by soaking in 'piranha solution' (1:4 30% $H_2O_2$: concentrated $H_2SO_4$) for 24 h, rinsed with copious quantities of DI water, soaked in isopropanol for 15 min (min=minute(s)), air dried and stored at ambient temperature until use. A model P6700 spin coater was used at 100 rpm for 10 s to deliver the sol and at 3000 rpm for 30 s to coat. All coated surfaces were dried at ambient temperature for at least seven days prior to analysis of the surface properties.

TABLE 1

Contact angles and surface energies of xerogel coatings. Values are the average of 3-5 replicate runs. Error limits are ± one standard deviation.

| Composition/ name | 100 TEOS | 20:80 TTIP/TEOS | 40:60 C8/TEOS | 20:40:40 TTIP/C8/TEOS |
|---|---|---|---|---|
| Stored in air | | | | |
| Static Water Contact Angle ($\theta°_{Ws}$) | 44 ± 2 | 45 ± 4 | 102.8 ± 0.6 | 99 ± 1 |
| Static $CH_2I_2$ Contact Angle ($\theta_{(CH2I2)s}$) | 46 ± 2 | 37 ± 1 | 69 ± 1 | 66 ± 1 |
| Total Surface Energy $\gamma_S$ (mN m−1) | 56 ± 2 | 57 ± 2 | 33 ± 0.2 | 25.0 ± 0.1 |
| Immersed 24 h in ASW Water | | | | |
| Static Water Contact Angle ($\theta°_{Ws}$) | 31 ± 1 | 35 ± 4 | 99.4 ± 0.8 | 94 ± 2 |
| Static $CH_2I_2$ Contact Angle ($\theta_{(CH2I2)s}$) | 47 ± 1 | 40 ± 2 | 65 ± 1 | 63 ± 1 |

TABLE 1-continued

Contact angles and surface energies of xerogel coatings. Values are the average of 3-5 replicate runs. Error limits are ± one standard deviation.

| Composition/name | 100 TEOS | 20:80 TTIP/TEOS | 40:60 C8/TEOS | 20:40:40 TTIP/C8/TEOS |
|---|---|---|---|---|
| Total Surface Energy $\gamma_S$ (mN m$^{-1}$) | 63.9 ± 0.6 | 62 ± 2 | 25.8 ± 0.8 | 27.5 ± 0.8 |
| Dispersive Surface Energy $\gamma_D$ (mN m$^{-1}$) | 28.8 ± 0.4 | 30.4 ± 0.6 | 22 ± 1 | 21.4 ± 0.4 |
| Polar Surface Energy $\gamma_P$ (mN m$^{-1}$) | 35.1 ± 0.5 | 29.9 ± 0.1 | 4.4 ± 0.3 | 6.1 ± 0.6 |
| % Polar surface energy | 54.9 ± 0.5 | 51 ± 1 | 17 ± 2 | 22 ± 2 |

Contact angles and surface energies of xerogel coatings pre- and post-immersion—xerogel films were stored in air prior to characterization. Static contact angles for the surface stored in air were measured and the coatings were immersed in ASW for 24 h followed by 1 h in DI water to remove salts. The coatings were then allowed to dry under ambient conditions for 3 h before contact angles were remeasured. Static water contact angles ($\theta_{WS}$) and static diiodomethane contact angles [$\theta_{(CH2I2)s}$] were measured on a 15 µl drop of fluid on the xerogel surface with a contact angle goniometer [Rame-Hart, Model NRL 100]; both sides of the droplet profile were measured.

Contact angles measured with water and diiodomethane were treated as described by Owens and Wendt (1969) to give total surface energy and its dispersive and polar components (Baier and Meyer 1992) as compiled in Table 1. Advanced and receded water contact angles were also measured by the sessile drop technique. A 15 µl drop of water was placed on the sample surface and the angle of contact between the droplet and the surface was measured as described above. Another droplet of water was placed on top of the first droplet (i.e. the fluid is advanced across the surface), and the measurements were repeated. Receded contact angles were measured by removal of fluid from the 'advanced' droplet.

Characteristics of xerogel coatings: scanning electron microscopy (SEM) —Scanning electron micrographs were recorded using a Hitachi model SU-70 field emission-SEM with a zirconium oxide/tungsten Schottky electron emission source, three state electromagnetic lens system, octapole electromagnetic type stigmator coil, two-state electromagnetic deflection type scanning coil, Everhart Thornly secondary electron detectors, and SEM Data Manager software 1.0.

Characteristics of xerogel coatings: X-ray photoelectron spectroscopy pre- and post-immersion—the xerogel coatings were also examined by X-ray photoelectron spectroscopy (XPS), pre- and post-immersion in DI water or 200 µM hydrogen peroxide (Tang et al. 2005, McMaster et al. 2009, Gatley et al. 2015) using a Physical Electronics Laboratories (PHI) Model 500 VersaProbe equipped with an Aluminum X-Ray source, a hemispherical analyzer and a 16 channel detector. A monochromatic Al k$\alpha^2$ source (1486.6 eV) was operated at 100 µm 25 W 15 kV with a 45° takeoff angle at a pressure not exceeding $5\times10^{-6}$ Pa in the main chamber. Pass energies of 117.4 eV and 25.30 eV were used to obtain survey and high resolution multiregion scans, respectively. Curve fitting was performed with PHI MultiPak™ Software Version 8.

A coated slide was cut into 1×1 cm samples using a diamond-tipped glass cutter. Initial analysis of the coating was performed on a dry sample that had been stored open to air. After dry analysis, the same sample was submersed for 24 h in DI water or in DI water with 200 µM $H_2O_2$. Following the soaking procedure, the sample was rinsed in deionized water and air-dried at ambient conditions for 8 h to ensure all water had evaporated off the coating prior to introduction to the high vacuum chamber of the instrument. While the air-drying step of the pretreatment may reverse changes to the coating caused by immersion, a dry coating is required for the high vacuum conditions of XPS. The composition of the surface, which is dry but previously immersed, corresponds to a kinetically trapped condition rather than the thermodynamic equilibrium state when in contact with water, as the recovery from immersion is slow for xerogel films (Evariste et al. 2013, Martinelli et al. 2008).

Kinetic Studies of halogenation reactions with xerogel monoliths: brominations—the bromination of 4-pentenoic acid was monitored by $^1$H NMR spectroscopy using previously described techniques (Gatley et al. 2015, Alberto et al. 2015). A xerogel-free control reaction was conducted for bromination and values of $k_{obs}$ are reported in Table 2 as an average of duplicate runs. A stock solution of phosphate buffer (0.23 M $KH_2PO_4$) prepared in $D_2O$ containing propionic acid (0.01 M) as an internal standard was prepared with a final pH of 7.0. The xerogel [8.7 mg; 20:80 TTIP/TEOS monolith, (0.027 mmol Ti, 0.035 equiv based on total Ti relative to substrate) or TEOS monolith] and NaBr (7.5 mmol, 1.4 M final concentration) were added to the reaction vessel. The buffer solution was added (5 mL) followed by 4-pentenoic acid (1, 0.075 g, 0.75 mmol, 0.014 M final concentration) and $H_2O_2$ (0.26 mL of a 4.4 M aqueous solution, 1.1 mmol, 0.21 M final concentration). The reaction vessels were stirred at 298±1 K. All reactions were run in duplicate, and reaction mixtures were periodically sampled by $^1$H NMR spectroscopy. The consumption of 4-pentenoic acid was measured by comparing the relative integral values of the internal alkene proton of 4-pentenoic acid (δ=5.8 ppm) and the methylene protons of propionic acid (δ=1.1 ppm). The experiments were followed through the first two to three half-lives and results plotted assuming pseudo-first order conditions (ln [4-pentenoic acid] vs. time (s)). Values of $k_{obs}$ are reported in Table 2 as an average of duplicate runs.

NMR spectra were recorded on an Inova 500 (500 MHz for $^1$H, 125 MHz for $^{13}$C) or Inova 300 instrument (300 MHz for $^1$H, 75 MHz for $^{13}$C) with residual solvent as the internal standard.

A similar procedure was followed with the 20:40:40 TTIP/C8/TEOS, 40:60 C8/TEOS xerogels and the other xerogels listed in Table 2. The xerogel [11.5 mg of the 20:40:40 TTIP/C8/TEOS monolith (0.025 mmol Ti, 0.033 equiv based on total Ti relative to substrate), or 11.5 mg of the 40:60 C8/TEOS monolith], NaBr (7.5 mmol, 1.4 M final concentration), 4-pentenoic acid (1, 0.075 g, 0.75 mmol, 0.014 M final concentration), and $H_2O_2$ (0.26 mL of a 4.4 M aqueous solution, 1.1 mmol, 0.21 M final concentration) in 5 mL of pH 7 buffer solution described above with propionic acid (0.01 M) as an internal standard were treated at 298±1 K as described above. Values of $k_{obs}$ are reported in Table 2 as an average of duplicate runs.

TABLE 2

Rates of halogenation of 4-pentenoic acid (1) with hydrogen peroxide and sodium halide salts at pH 7 and 298 ± 1 K in the presence of xerogel catalysts. Values are the average of duplicate runs. Error limits are ± one half of the range.

| entry | Xerogel | Metal, mol-% | $k_{obs}$, s$^{-1}$ | $k_{rel}$ |
|---|---|---|---|---|
| | | Bromination | | |
| 1 | none | — | $(1.39 \pm 0.06) \times 10^{-6}$ | — |
| 2 | 100 TEOS | 0 | $(7.6 \pm 1.0) \times 10^{-7}$ | 1 |
| 3 | 20:80 TTIP:TEOS | 3.5 | $(8.44 \pm 0.10) \times 10^{-5}$ | 110 |
| 4 | 40:60 C8:TEOS | 0 | $(5.9 \pm 1.0) \times 10^{-7}$ | 0.8 |
| 5 | 20:40:40 TTIP:C8:TEOS | 3.5 | $(3.37 \pm 0.09) \times 10^{-6}$ | 4.4 |
| 6 | 1% $V_2O_5$ in TEOS | 3.5 | $(1.09 \pm 0.01) \times 10^{-6}$ | 1.5 |
| 7 | 1% $V_2O_5$ 1% PEG in TEOS | 3.5 | $(8.50 \pm 0.47) \times 10^{-6}$ | 11 |
| 8 | 1% $V_2O_5$ in 1:99 APTES:TEOS | 3.5 | $(4.30 \pm 0.18) \times 10^{-6}$ | 5.7 |
| 9 | 1% $V_2O_5$ in 10:90 C12:TEOS | 3.5 | $(8.08 \pm 0.36) \times 10^{-6}$ | 11 |
| | | Chlorination | | |
| 6 | none | — | $(1.8 \pm 0.4) \times 10^{-7}$ | — |
| 7 | 100 TEOS | 0 | $(2.01 \pm 0.07) \times 10^{-7}$ | 1 |
| 8 | 20:80 TTIP:TEOS | 60 | $(1.51 \pm 0.05) \times 10^{-5}$ | 75 |
| 8 | 50:50 TTIP:TEOS | 60 | $(1.03 \pm 0.04) \times 10^{-5}$ | 50 |
| 8 | 50:50 MoPIP:TEOS | 60 | $(8.96 \pm 0.33) \times 10^{-6}$ | 45 |
| 8 | 50:50 WPIP:TEOS | 60 | $(2.68 \pm 0.04) \times 10^{-6}$ | 13 |
| 9 | 40:60 C8:TEOS | 0 | $(2.00 \pm 0.11) \times 10^{-7}$ | 1 |
| 10 | 20:40:40 TTIP:C8:TEOS | 20 | $(1.03 \pm 0.05) \times 10^{-6}$ | 5.1 |
| 11 | 20:40:40 TTIP:C8:TEOS | 60 | $(4.63 \pm 0.24) \times 10^{-6}$ | 23 |
| 12 | 40:20:40 TTIP:C8:TEOS | 60 | $(1.20 \pm 0.13) \times 10^{-5}$ | 60 |
| 13 | 20:40:40 APTES:TTIP:TEOS | 60 | $(5.44 \pm 0.06) \times 10^{-6}$ | 27 |

Kinetic studies of halogenation reactions with xerogel monoliths: chlorination—The chlorination of 4-pentenoic acid was monitored by $^1$H NMR spectroscopy using appropriate modifications of previously described techniques (Gatley et al. 2015, Alberto et al. 2015). The product of chlorination of 4-pentenoic acid (1) was 5-(chloromethyl) dihydrofuran-2(3H)-one (3b in Scheme 1), whose spectral characteristics match those previously reported (Genovese et al. 2010): $^1$H NMR (CDCl$_3$, 300 MHz): δ 4.81-4.74 (m, 1H), 3.72-3.70 (m, 2H), 2.67-2.56 (m, 2H), 2.48-2.38 (m, 1H), 2.24-2.11 (m, 1H). $^{13}$C NMR (CDCl$_3$, 300 MHz): δ 176.30, 78.12, 46.00, 28.18, 24.93. HRMS (EI) m/z 134.0126 (Calcd for $C_5H_7O_2{}^{35}Cl^+$: 134.0129). A xerogel-free control reaction was conducted for chlorination and values of $k_{obs}$ are reported in Table 2 as an average of duplicate runs.

The xerogel [as one example, 0.15 g; 20:80 TTIP/TEOS monolith, (0.45 mmol Ti, 0.60 equiv relative to substrate) or TEOS monolith] and NaCl (15 mmol, 2.7 M final concentration) were added to 5 mL of the pH 7 buffer solution described above followed by 4-pentenoic acid (1, 0.075 g, 0.750 mmol, 0.14 M final concentration) and $H_2O_2$ (0.43 mL of an 8.8 M solution, 3.8 mmol, 0.68 M final concentration). The reaction vessels were stirred at 298±1 K. All reactions were run in duplicate, and reaction mixtures were periodically sampled via $^1$H NMR spectroscopy as described above. Values of $k_{obs}$ are reported in Table 2 as an average of duplicate runs.

A similar procedure was followed with the 20:40:40 TTIP/C8/TEOS, 40:20:40 TTIP/C8/TEOS and 40:60 C8/TEOS xerogels and the other xerogels of Table 2. The xerogel [0.23 g of the 20:40:40 TTIP/C8/TEOS monolith (0.45 mmol Ti, 0.60 equiv based on total Ti relative to substrate) or 0.23 g of the 40:60 C8/TEOS monolith], NaCl (15 mmol, 2.7 M final concentration), 4-pentenoic acid (1, 0.075 g, 0.75 mmol, 0.014 M final concentration), and $H_2O_2$ (0.43 mL of an 8.8 M solution, 3.8 mmol, 0.68 M final concentration) in 5 mL of pH 7 buffer solution described above were treated at 298±1 K as described above. Values of $k_{obs}$ are reported in Table 2 as an average of duplicate runs.

Biological Assays—Ulva-linza Settlement Assay—fronds of Ulva linza were collected from Llantwit Major, Wales (51840'N; 3848'W) and a spore suspension of 1.0×10$^6$ spores mL$^{-1}$ was prepared by the method of Callow, et al. (1997). The experiment used 3 replicates of each coating for each treatment. All coatings were equilibrated in 0.22 μm-filtered ASW with added $H_2O_2$ (0, 50, 100 and 150 μM) depending on the treatment for 24 h prior to testing. A suspension of zoospores (10 mL; 1×10$^6$ spores mL$^{-1}$) was added to individual compartments of quadriPERM® dishes containing the samples. After 45 minutes in darkness at 20° C., the slides were washed by passing 10× through a beaker of seawater to remove unsettled (i.e. swimming) spores. Slides were fixed using 2.5% glutaraldehyde in seawater. The density of zoospores attached to the surface was counted on each of 3 replicate slides using an image analysis system attached to a fluorescence microscope. Spores were visualized by autofluorescence of chlorophyll. Counts were made for 30 fields of view (0.15 mm$^2$) on each slide.

Biological Assays—Ulva linza Attachment Assay—spores were allowed to settle on 6 additional coatings for 45 minutes and then washed as described above. The spores were cultured using supplemented seawater medium for 7 days to produce sporelings (young plants) on 6 replicate slides of each treatment. Sporeling growth medium was refreshed every 48 h along with $H_2O_2$ as appropriate. Sporeling biomass was determined in situ by measuring the fluorescence of the chlorophyll contained within the sporelings in a Tecan fluorescence plate reader. Using this method the biomass was quantified in terms of relative fluorescence units (RFU). The RFU value for each slide is the mean of 70 point fluorescence readings taken from the central portion. The sporeling growth data are expressed as the mean RFU of 6 replicate slides. Strength of attachment of sporelings was assessed using an impact pressure of 20 kPa from a water jet. Biomass remaining was determined using the fluorescence plate reader (as above). The percentage removal was calculated from readings taken before and after exposure to the water jet.

Biological Assays—Data Analysis and Statistics—multiple data sets were acquired for each sample, and typical results are presented. Statistical significance was assessed by using one way ANOVA at the 95% confidence level with pairwise comparison (Tukey test) ($p<0.05$ being significant).

Results—Characterization of surfaces: appearance and optical transparency—the 20:80 TTIP/TEOS and 20:40:40 TTIP/C8/TEOS sols were cast onto borosilicate glass slides via spin-coating to give optically transparent coatings as illustrated in FIG. 1a for the 20:40:40 TTIP/C8/TEOS xerogel. The sols can also be applied to larger surfaces via dip-coating as illustrated in FIG. 1b for a 20:40:40 TTIP/C8/TEOS-coated, 100 mm×200 mm epoxy-primed fiberglass panel. Both surfaces are uniform in appearance.

Results—Characterization of surfaces: contact angles and surface energies—static water contact angles, $\theta°_{Ws}$ and static diiodomethane contact angles, $\theta°_{(CH2I2)s}$ (Table 1) were measured for all xerogel surfaces described in this study pre- and post-immersion in ASW. Advancing ($\theta°_{Wa}$) and receding ($\theta°_{Wr}$) values of $\theta°_W$ were also measured for all of the surfaces and are compiled in Table S1 (Supporting Information). Contact angles measured with water and diiodomethane were treated as described by Owens and Wendt (1969) to give total surface energy ($\gamma_S$) (Baier and Meyer 1992) for the xerogel surfaces of this study pre- and post-immersion in ASW (Table 1).

Prior to immersion, the TEOS and the 20:80 TTIP/TEOS xerogel coatings have comparable values of $\theta°_{Ws}$, (44° and 45°, respectively, Table 1) and γs (56.0 and 57.1 mN m$^{-1}$, respectively) that are not significantly different (p>0.05, Student t-test). Post immersion, values of $\theta°_{Ws}$ (31° and 35°, respectively) decreased significantly (p<0.05) and values of γs (63.9 and 62.1 mN m$^{-1}$, respectively) increased significantly (p<0.05) from pre-immersion values. However, comparing these values for both surfaces post immersion indicated that differences between the two surfaces were not significant (p>0.05).

The 40:60 C8/TEOS xerogel coating and the 20:40:40 TTIP/C8/TEOS xerogel coating have comparable values of $\theta°_{Ws}$ (102.8° and 99.1°, respectively) and γs (23.2 and 25.0 mN m$^{-1}$, respectively) pre-immersion in ASW (Table 1). Following immersion, values of $\theta°_{Ws}$ (99.4° and 94.1° for the 40:60 C8/TEOS and the 20:40:40 TTIP/C8/TEOS xerogels, respectively) decreased significantly (p<0.05) and values of $\gamma_S$ (25.8 and 27.5 mN m$^{-1}$, respectively) increased significantly (p<0.05) from pre-immersion values. Following immersion, values of $\gamma_S$ were not significantly different (p>0.05) for the two surfaces.

Figure 2:
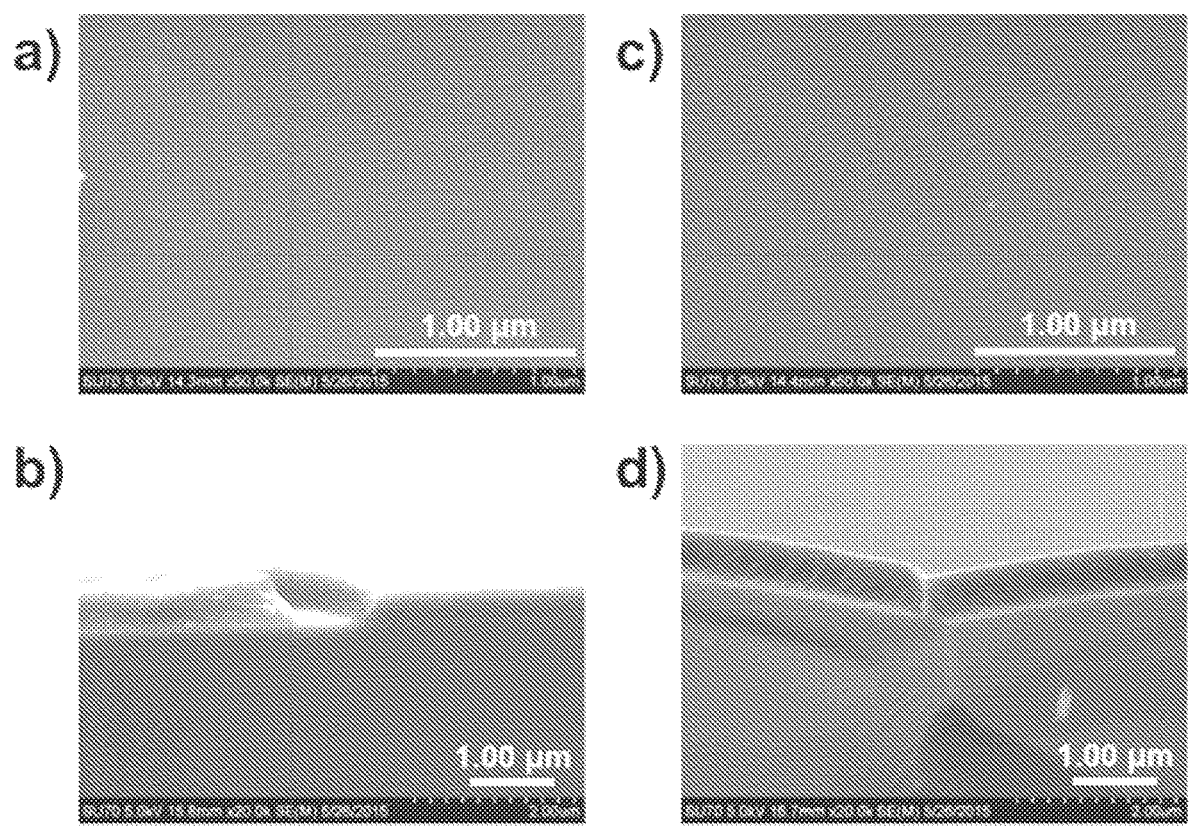
FIG. 2 shows SEM images of a 20:40:40 TTIP/C8/TEOS xerogel a) from above and b) along an edge stored in air and c) from above and d) along an edge post-immersion in ASW.

Results—Characterization of surfaces: scanning electron microscopy (SEM)—FIG. 2 depicts typical SEM images for the 20:40:40 TTIP/C8/TEOS xerogel viewed from the top and along an edge pre- and post-immersion in ASW. Pre-immersion images were obtained from xerogel surfaces stored in air for one week following coating. Post-immersion images were obtained from xerogel surfaces immersed in ASW for 24 h followed by a rinse with deionized (DI) water. The xerogel surfaces are smooth and uncracked both pre- and post-immersion. The view along the edge shows that the surfaces are approximately 0.5 μm thick.

Figure 3:
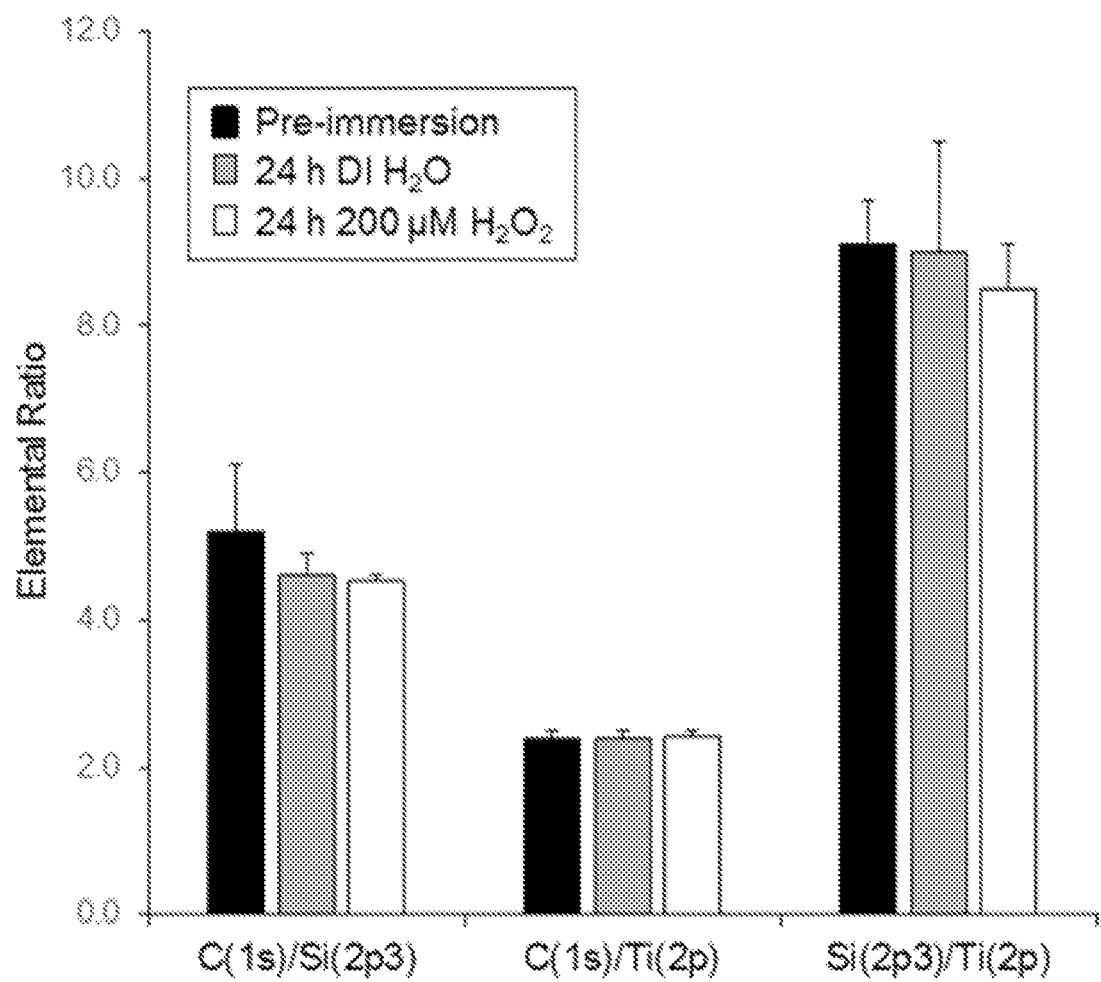
FIG. 3 shows changes in a 20:40:40 TTIP/C8/TEOS xerogel pre- and post-immersion in DI water or 200 μM $H_2O_2$ as determined by XPS. Mean of four independent measurements for coatings either pre-immersion or post-immersion for 24 in DI water or 24 h (h=hour(s)) in 200 μM $H_2O_2$. Error bars represent 1 SD for the four independent measurements for the three conditions.

Results—Characterization of surfaces: X-ray photoelectron spectroscopy (XPS)—XPS spectra of the 20:40:40 TTIP/C8/TEOS xerogel surfaces were recorded at a take-off angle of 45° to determine the atomic composition at the surface of the xerogel coating pre- and post-immersion for 24 h in DI water or for 24 h in 200 μM $H_2O_2$. The results are shown in FIG. 3 as elemental ratios for the C(1s)/Si(2p3), C(1s)/Ti(2p), and Si(2p3)/Ti(2p) signals as determined by area under the peaks corrected for relative sensitivity factors. In clean borosilicate glass, the ratio of the C(1s)/Si(2p3) signals is 0.28±0.02, which is quite similar to the ratio of 0.2 reported by Tang et al. (2005), suggesting a relatively carbon-free surface with any carbon found at the ostensibly $SiO_2$ surface presumably arising from adventitious/adsorbed carbon-containing species from the atmosphere.

The elemental ratios shown in FIG. 3 are not significantly different pre- and post-immersion in either DI water or 200 μM $H_2O_2$ (p>0.05). These data suggest that neither immersion in water nor exposure to aqueous peroxide results in significant changes to the surface structure with respect to C, Si, and Ti.

Results—Oxidation of bromide and chloride with $H_2O_2$ catalyzed by TTIP/TEOS and TEOS-only xerogels—for the xerogel coatings to have AF characteristics, the coatings should oxidize halide salts to hypohalous acids. A monolith of 20 mol-% TTIP and 80 mol-% tetraethoxy orthosilicate (TEOS) was prepared (20:80 TTIP/TEOS) and ground into a fine powder using a mortar and pestle. For comparison, a second, Ti-free monolith was prepared from TEOS only and was similarly ground into a fine powder. The ability of these two monoliths to catalyze the halogenation of 4-pentenoic acid (1) to give 4,5-dihalopentanoic acids 2 and/or 5-(halomethyl)dihydrofuran-2(3H)-ones 3 (Scheme 1) with $H_2O_2$ and either NaBr or NaCl was examined.

Scheme 1. Halogenation of 4-pentenoic acid (1) with hypobromous or hypochlorous acid.

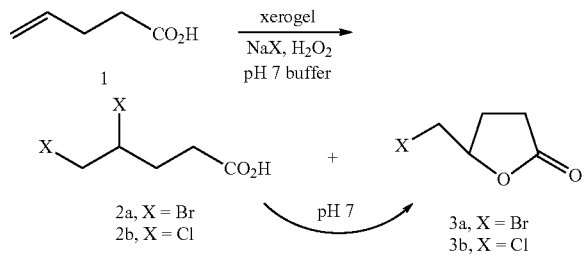

Figure 4:
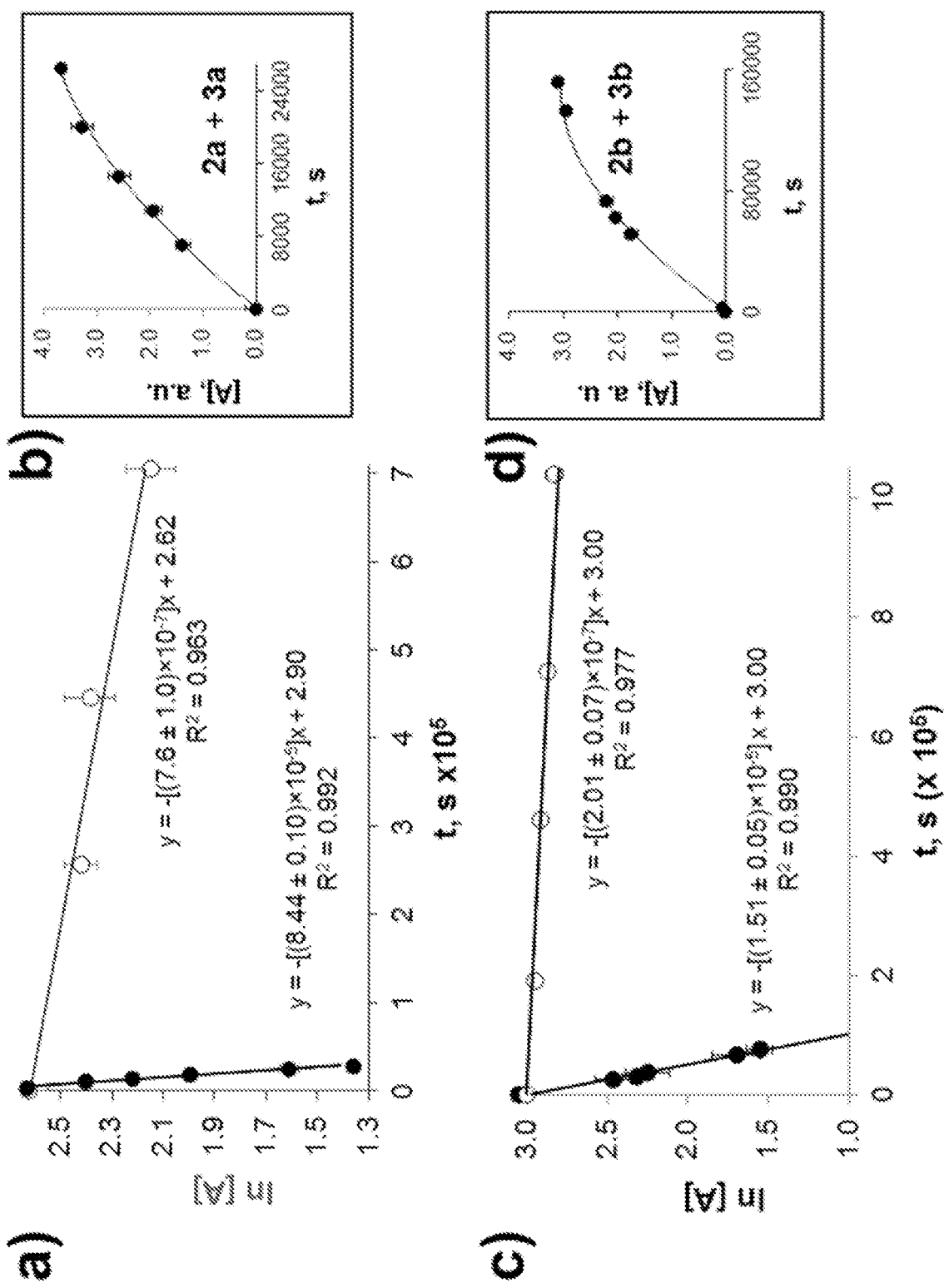
FIG. 4 shows a) rate of loss of 4-pentenoic acid (1) and b) appearance of brominated products 2a and 3a using 3.5 mol-% (in Ti) of a 20:80 TTIP/TEOS xerogel (filled circles) compared to TEOS-only control (open circles) with 1.4 M NaBr and 0.21 M $H_2O_2$ at pH 7 and 298±1 K. c) Rate of loss of 4-pentenoic acid (1) and d) appearance of chlorinated products 2b and 3c using 70 mol-% (in Ti) of the 20:80 TTIP/TEOS xerogel (filled circles) compared to a TEOS-only control (open circles) with 2.7 M NaBr and 0.68 M $H_2O_2$ at pH 7 and 298±1 K.

The bromination of 1 with 1.4 M NaBr and 0.21 M $H_2O_2$ at pH 7 with the 20:80 TTIP/TEOS monolith (3.5 mol-% Ti relative to 1) or an equivalent weight of the TEOS monolith at 298±1 K was followed by $^1$H NMR spectroscopy. The loss of 1 was followed as well as the appearance of a mixture of 4,5-dibromopentanoic acid (2a) and bromolactone 3a. The $^1$H NMR chemical shifts of the olefinic protons of 1 are distinct from the bromomethine proton of 2a and the lactone methine proton of 3a. At pH 7, 2a is converted to 3a upon standing. As shown in FIG. 3a, pseudo-first-order behavior was observed for the loss of 1 in the presence of the 20:80 TTIP/TEOS xerogel with concomitant formation of 2a and 3a (FIG. 4b) with a rate constant, $k_{obs}$, of (8.44±0.10)×10$^{-5}$ s$^{-1}$ (Table 2). In contrast, the Ti-free, TEOS-only xerogel gave $k_{obs}$ of (7.6±1.0)×10$^{-7}$ (FIG. 4a, Table 2). The 1% $V_2O_5$ in TEOS monolith also catalyzed the oxidation of bromide with hydrogen peroxide (Table 2).

Oxidation of chloride under these conditions was slower at 298±1 K and utilized higher concentrations of NaCl (2.7 M) and $H_2O_2$ (0.68 M) and a 70 mol-% in Ti loading of the 20:80 TTIP/TEOS xerogel. As shown in FIG. 4c, pseudo-first-order behavior was observed for the loss of 1 in the presence of the 20:80 TTIP/TEOS xerogel with concomitant formation of 2b and 3b (FIG. 4d) with a rate constant, $k_{obs}$, of (1.51±0.05)×10$^{-5}$ s$^{-1}$ (Table 1). In contrast, the Ti-free, TEOS only xerogel gave $k_{obs}$ of (2.01±0.07)×10$^{-7}$ (Table 1). The 50:50 TTIP/TEOS, 50:50 WPIP/TEOS, and 50:50 MoPIP/TEOS xerogels also catalyzed the oxidation of chloride with hydrogen peroxide (Table 2).

Results—Oxidation of chloride and bromide with $H_2O_2$ catalyzed by TTIP/C8/TEOS and C8/TEOS xerogels—a monolith of 20 mol-% TTIP, 40 mol-% C8, and 40 mol-% TEOS was prepared (20:40:40 TTIP/C8/TEOS) and ground into a fine powder using a mortar and pestle. For comparison, a second, Ti-free 40:60 C8/TEOS monolith was prepared and was similarly ground into a fine powder. The ability of these two monoliths to catalyze the halogenation of 1 to 2 and/or 3 (Scheme 1) with $H_2O_2$ and either NaBr or NaCl was examined.

Bromination of 1 with 1.4 M NaBr and 0.21 M $H_2O_2$ at pH 7 with the 20:40:40 TTIP/C8/TEOS monolith (3.5 mol-% Ti relative to 1) or an equivalent weight of a 40:60 C8/TEOS monolith gave values of $k_{obs}$ of $(3.37\pm0.09)\times10$'s$^1$ and $(5.9\pm1.0)\times10^{-7}$ s$^{-1}$ for the TTIP/C8/TEOS and C8/TEOS monoliths, respectively (Table 2). Chlorination of 1 with 2.7 M NaCl and 0.68 M $H_2O_2$ at pH 7 with the 20:40:40 TTIP/C8/TEOS monolith (60 mol-% Ti relative to 1) or an equivalent weight of the 40:60 C8/TEOS monolith gave values of $k_{obs}$ of $(4.63\pm0.24)\times10^{-6}$ s$^{-1}$ and $(2.00\pm0.11)\times10^{-7}$ s$^{-1}$, respectively (Table 2). An intermediate level of the 20:40:40 TTIP/C8/TEOS monolith (20 mol-% Ti relative to 1) gave $k_{obs}$ for chlorination of 1 of $(1.03\pm0.05)\times10^{-6}$ s$^{-1}$ (Table 2).

Xerogels organically modified with dodecyltriethoxysilane (C12), 3-aminopropyltriethoxysilane (AP), or polyethyleneglycol (PEG) incorporating transition metal oxides also catalyzed the oxidation of chloride or bromide with hydrogen peroxide (Table 2).

Figure 5:
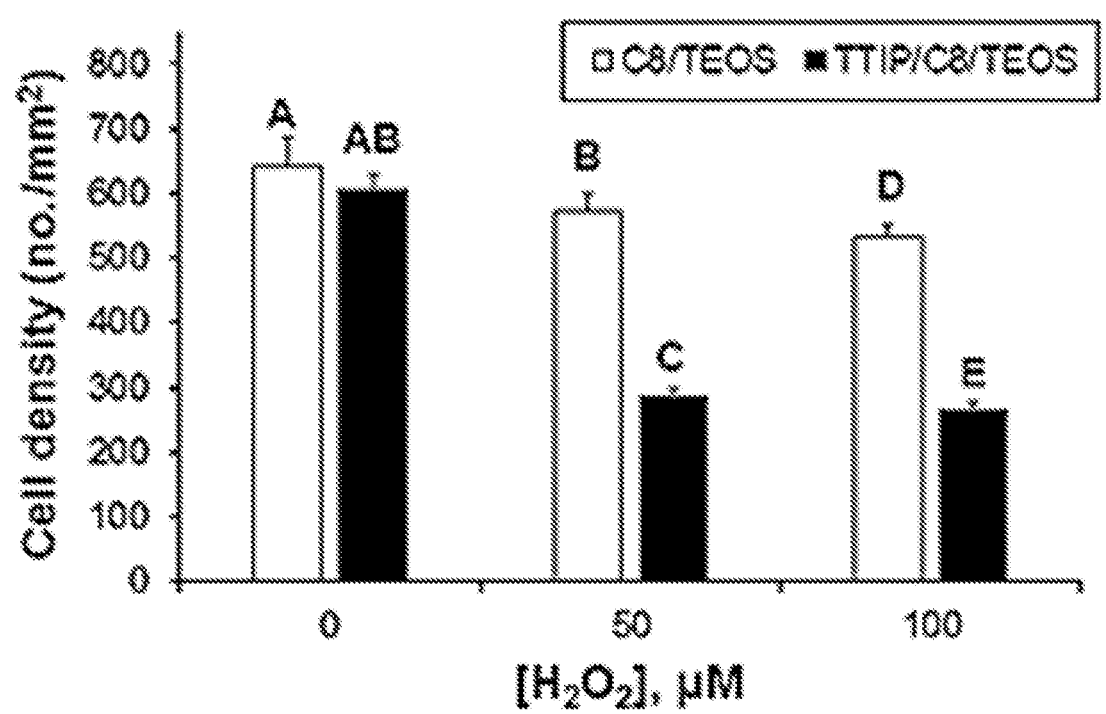
FIG. 5 shows the density of attached spores on C8/TEOS and TTIP/C8/TEOS coatings after 45 minutes settlement time in the presence of different concentrations of $H_2O_2$. Each point is the mean from 90 counts on 3 replicate slides. Bars show 95% confidence limits. Values of the bars that share a letter are not significantly different (p>0.05) from one another.

Results—studies on Ulva zoospores—The 20:40:40 TTIP/C8/TEOS xerogel and the 50:50 C8/TEOS xerogel that has served as a control xerogel surface in numerous prior studies (Benett et al. 2010, Gunari et al. 2011, Sokolova et al. 2012, Sokolova et al. 2012a) were soaked in ASW or in ASW with different concentrations of hydrogen peroxide for 24 h prior to settlement of Ulva zoospores. As shown in FIG. 5, there was not a significant difference (p>0.05) in settlement of Ulva zoospores in the absence of peroxide on the control 50:50 C8/TEOS xerogel surface or on the 20/40/40 TTIP/C8/TEOS xerogel surface.

The addition of $H_2O_2$ gave significant decreases in zoospore settlement on both the C8/TEOS and TTIP/C8/TEOS coatings although the impact was much greater on the TTIP/C8/TEOS coating (FIG. 5). The addition of 50 μM $H_2O_2$ gave an 11% decrease in mean settlement (p<0.02) on the C8/TEOS coating, but gave a 53% decrease in mean settlement on the TTIP/C8/TEOS coating (p<0.0001) relative to ASW only. The addition of 100 μM $H_2O_2$ gave a 17% decrease in settlement on the C8/TEOS coating, but gave a 56% decrease in settlement on the TTIP/C8/TEOS coating relative to ASW only. The differences in zoospore settlement between surfaces treated with 50 μM and 100 μM $H_2O_2$ shown in FIG. 5 were significant for both the C8/TEOS (p=0.02) and TTIP/C8/TEOS (p=0.015) surfaces. At 150 μM $H_2O_2$ in ASW (data not shown), settlement of zoospores was reduced by >50% on both surfaces relative to ASW only treatment indicating that 150 μM $H_2O_2$ alone was impacting settlement behavior.

Figure 6:
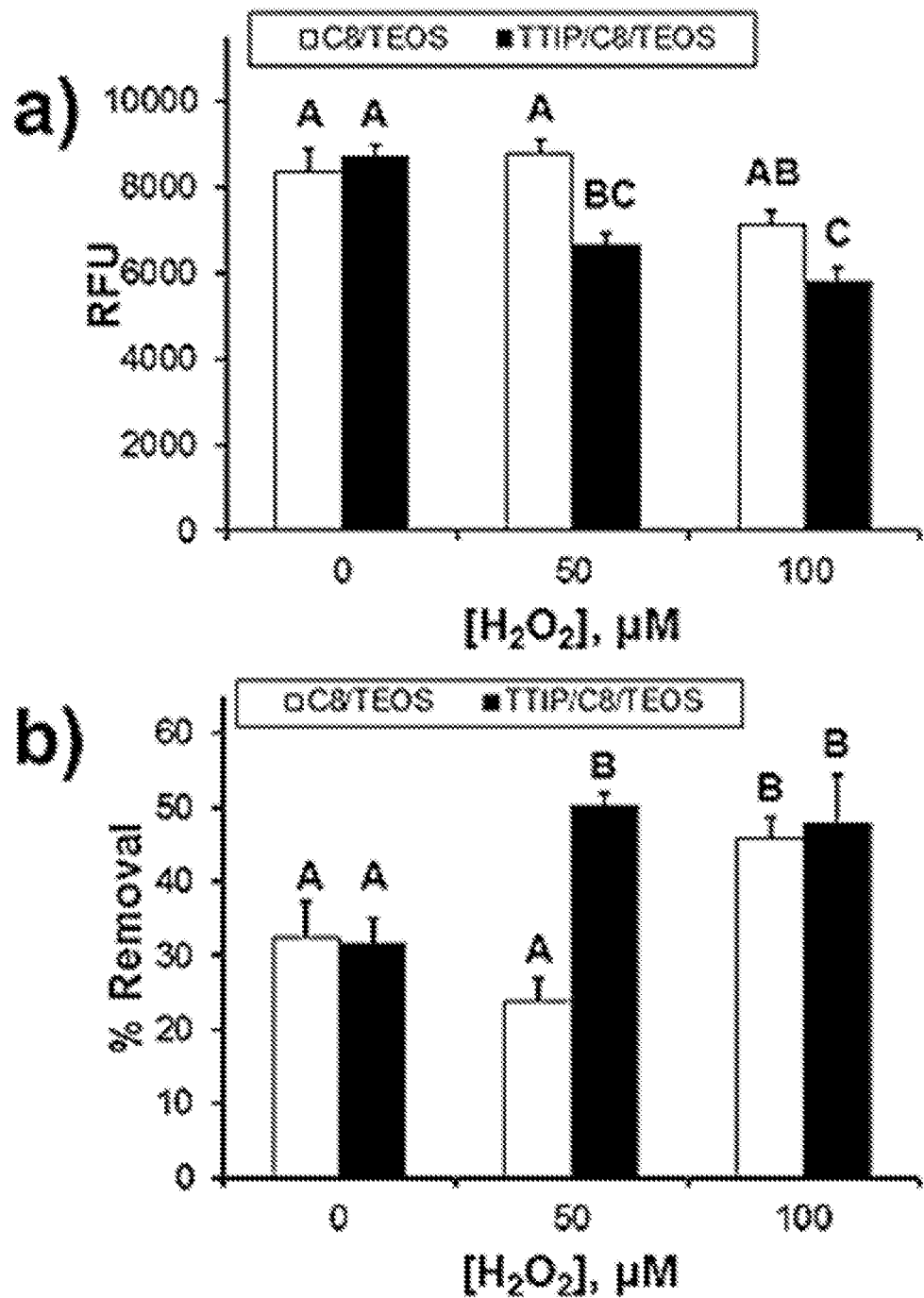
FIG. 6 shows a) biomass of sporelings on C8/TEOS and TTIP/C8/TEOS coatings after 7 days. Each point is the mean biomass from 6 replicate slides measured using a fluorescence plate reader (RFU; relative fluorescence unit). b) Percent removal of 7-day-old sporelings from coatings due to an impact pressure of 20 kPa. Each point is the mean removal of biomass from 6 replicate slides measured using a fluorescence plate reader. Bars show standard error of the mean. Values of the bars that share a letter are not significantly different (p>0.05) from one another.

Results—Strength of attachment of sporelings of Ulva—sporelings grew well on all surfaces in ASW only and with 50 μM and 100 μM $H_2O_2$. A green covering was visible on all surfaces after seven days. In the absence of $H_2O_2$, there was no significant difference in sporeling biomass (p>0.05) on the C8/TEOS and TTIP/C8/TEOS coatings (FIG. 6a). The 50 μM $H_2O_2$ had no significant impact on sporeling biomass on the C8/TEOS control. The presence of 50 μM $H_2O_2$ gave a significant 23% reduction (p=0.03) in sporeling biomass on the TTIP/C8/TEOS coating, which was also significantly less (p=0.03) than the C8/TEOS coating in ASW with 50 μM $H_2O_2$. The presence of 100 μM $H_2O_2$ gave a 33% decrease (p<0.003) in sporeling biomass on the TTIP/C8/TEOS surface relative to ASW only, but this decrease was not significant relative to ASW with 50 μM $H_2O_2$.

The strength of attachment of 7-day old sporelings was assessed using an impact pressure of 20 kPa from a water jet. There was no significant difference in the percentage of sporelings removed on the C8/TEOS control and TTIP/C8/TEOS xerogel in the ASW-only treatment (FIG. 6b, 32% removal on each, p>0.05). With 50 μM $H_2O_2$, the removal of sporelings from the TTIP/C8/TEOS xerogel was significantly greater (50% removal) than ASW only treatments or 50 μM $H_2O_2$ with the C8/TEOS coating (p<0.05). With 100 μM $H_2O_2$, there was no significant difference between the C8/TEOS control and TTIP/C8/TEOS xerogel, which suggested that $H_2O_2$ alone was impacting the strength of adhesion.

Discussion—Our xerogels incorporate mixed transition metal and silicon oxides in order to introduce various metal oxides as a catalyst for the activation of hydrogen peroxide in the inorganic matrix of the xerogel coating. Both the 20:80 TTIP/TEOS and 20:40:40 TTIP/C8/TEOS xerogels accelerated the production of hypohalous acids from the corresponding sodium halide salt and hydrogen peroxide as measured by the halogenation of 4-pentenoic acid (1) and have potential as AF surfaces (Scheme 1). At 3.5 mol-% Ti relative to 1, bromination was accelerated 110-fold by the 20:80 TTIP/TEOS monolith relative to the Ti-free TEOS-only xerogel (Table 2, FIGS. 4a and 4b). Chlorination of 1 with sodium chloride and hydrogen peroxide was slower than bromination, but at 60 mol-% Ti relative to 1, chlorination was 75-fold faster with the 20:80 TTIP/TEOS monolith relative to the Ti-free TEOS-only xerogel (Table 2, FIGS. 4c and 4d). The 20:40:40 TTIP/C8/TEOS is less active as a catalyst than the 20:80 TTIP/TEOS xerogel but, nevertheless, catalyzes the oxidation of bromide and chloride with hydrogen peroxide relative to the Ti-free 40:60 C8/TEOS xerogel control (Table 2). This surface also displayed AF behavior toward the settlement of Ulva zoospores in the presence of hydrogen peroxide (FIG. 5).

The performance of FR coatings is influenced by the inherent surface energy ($\gamma_s$) of the coating. For biofouling applications, $\gamma_S$ describes the mechanical work necessary to overcome an organism's attractive force to separate the organism from the surface. In doing so, a new surface is created, and $\gamma_S$ defines the energy required to create a new unit area of surface (mN m$^{-1}$). Replacing TEOS in the xerogel formulations with 20 mol-% TTIP actually has minimal impact on relative values of $\gamma_S$ or $\theta_{Ws}$. Comparing the TEOS-only and 20:80 TTIP/TEOS coatings, replacing TEOS with TTIP in the xerogel formulation gave no statistically significant differences between the two surfaces on values of $\gamma_S$ or on $\theta_{Ws}$ before and after immersion in ASW (Table 1). For these two surfaces, values of $\gamma_S$ are high and values of $\theta_{Ws}$ are low, which precludes effective FR behavior. Comparing the C8/TEOS and TTIP/C8/TEOS coatings, replacing TEOS with 20 mol-% TTIP had no significant impact on $\gamma_S$ (21-22 mN m$^{-1}$, Table 1) post-immersion in ASW although the 40:60 C8/TEOS coating showed a slightly (significantly) higher value of $\theta_{Ws}$ (99.4±0.8°) relative to the 20:40:40 TTIP/C8/TEOS surface (94±2°, Table 1). However, these coatings are more hydrophobic with lower surface energy than the 20:80 TTIP/TEOS and TEOS-only xerogels and performed as FR coatings with Ulva sporelings.

As shown in FIG. 1, the 20:40:40 TTIP/C8/TEOS coating is colorless and transparent while the scanning electron micrographs of FIG. 2 show that the surface is smooth and uncracked. The SEM images of this surface appear quite similar to those reported for the 50:50 C8/TEOS surface (Tang et al. 2005) and again indicate that the substitution of TTIP for TEOS in the xerogel formulations has minimal impact on surface characteristics.

In the absence of hydrogen peroxide, no significant difference (p>0.05) was observed in the settlement of zoospores of Ulva on the C8/TEOS xerogel control or on the TTIP/C8/TEOS active xerogel surface (FIG. 5). With 50 µM hydrogen peroxide, mean zoospore settlement was reduced by 11% (p<0.02) on the C8/TEOS coating, but gave a 53% decrease in mean settlement on the TTIP/C8/TEOS coating. The difference in settlement between the two surfaces is now significant (p<0.0001) and suggests that the Ti-catalyst activates hydrogen peroxide for the oxidation of halide salts on the coating surface to discourage settlement of Ulva zoospores. Increasing the hydrogen peroxide concentration to 100 µM gave a slight additional reduction in settlement.

Following zoospore settlement, there was no significant difference in 7-day-old sporeling biomass on the TTIP/C8/TEOS surfaces relative to the C8/TEOS control. In the presence of 50 µM hydrogen peroxide, less (but significantly less) sporeling biomass was observed on the TTIP/C8/TEOS surfaces relative to the C8/TEOS control, which may reflect the reduced settlement of zoospores on the TTIP/C8/TEOS surfaces. At 100 µM hydrogen peroxide, the difference between the TTIP/C8/TEOS surface and the C8/TEOS control, while still significant, was reduced.

The FR characteristics of the TTIP/C8/TEOS surfaces were observed in the removal of 7-day old sporelings in the presence or absence of hydrogen peroxide. In the absence of hydrogen peroxide, no significant difference in the removal of sporelings was observed in comparing the C8/TEOS and TTIP/C8/TEOS coatings (32% removal from each). However, the removal of sporelings cultured in the presence of 50 µM hydrogen peroxide was significantly greater from the TTIP/C8/TEOS coatings (52% removal) than from the control C8/TEOS coatings (23% removal). At 100 µM hydrogen peroxide, there was no longer a significant difference in the removal of sporeling biomass between the two surfaces (45-50% removal).

In conclusion, the incorporation of TTIP into silica-derived xerogels can provide "active" xerogel surfaces that use reagents found in seawater (hydrogen peroxide, 0.5 M chloride, 1 mM bromide, and 1 µM iodide) to produce hypohalous acids. The "active" xerogel provides negative settlement cues for the settlement of Ulva zoospores and reduce the strength of adhesion of Ulva sporelings to the surface. Replacing TEOS with TTIP in the xerogel formulations has minimal impact on xerogel surface characteristics and the mixed titania/silica xerogels remain transparent and applicable via a variety of coating techniques. This approach can be extended to balance AF and FR properties through the use of different transition metal oxides at different loading levels for AF properties and through the use of different organo(trialkoxy)silanes for FR characteristics. Such extensions are within the scope of this disclosure.

The invention claimed is:

1. A composition comprising a transition metal oxide and silicon oxide xerogel matrix,
wherein the xerogel matrix is formed from a sol-gel composition comprising:
0.25 mole % to 25 mole % of a transition metal alkoxide and/or a transition metal oxide, and
45 mole % to 90 mole % of a tetraalkoxysilane, and wherein the sol-gel composition further comprises:
10 mole % to 55 mole % of a $C_1$-$C_{12}$ alkyltrialkoxysilane or
10 mole % to 55 mole % of an aminoalkyl-, alkylaminoalkyl-, or
dialkylaminoalkyltrialkoxysilane, with the proviso that the total mol % of the transition metal alkoxide and/or transition metal oxide and tetraalkoxysilane and $C_1$-$C_{12}$ alkyltrialkoxysilane, if present, and the aminoalkyl-, alkylaminoalkyl-, or dialkylaminoalkyltrialkoxysilane, if present, does not exceed 100 mol %,
wherein the composition is a thin film disposed on a surface having a thickness of 1 to 20 microns.

2. The composition of claim 1, wherein the $C_1$-$C_{12}$ alkyltrialkoxysilane is selected from the group consisting of n-propyltrimethoxysilane, n-octyltriethoxysilane, or n-dodecyltriethoxysilane, and combinations thereof.

3. The composition of claim 1, wherein the aminoalkyl-, alkylaminoalkyl-, or dialkylaminoalkyltrialkoxysilane is selected from the group consisting of aminopropyltriethoxysilane (AP or APTES), methylaminopropyltriethoxysilane (MAP), or dimethylaminopropyltriethoxysilane (DMAP), and combinations thereof.

4. The composition of claim 1, wherein the thin film is disposed on a surface selected from the group consisting of woods, plastics, glasses, metals, and combinations thereof.

5. The composition of claim 1, wherein the transition metal alkoxide is selected from the group consisting of titanium tetraisopropoxide (TTIP), oxovanadium triisopropoxide (VOTIP), or tungsten pentaisopropoxide (WPIP), and combinations thereof and/or the transition metal oxide is selected from vanadium oxide ($V_2O_5$).

6. The composition of claim 1, wherein the tetraalkoxysilane is selected from the group consisting of tetramethoxysilane (TMOS), tetraethoxysilane (TEOS), or tetraisopropoxysilane (TIPOS), and combinations thereof.

7. A method of providing a thin film xerogel coating on a surface comprising:
applying a sol-gel composition comprising:
i) 0.25 mole % to 50 mole % of a transition metal alkoxide and/or transition metal oxide, and
50 to 99.75 mole % of a tetraalkoxysilane, with the proviso that the total mol % of the transition metal alkoxide and/or transition metal oxide and tetraalkoxysilane does not exceed 100 mol %, or
ii) 0.25 mole % to 25 mole % of a transition metal alkoxide,
45 mole % to 90 mole % of a tetraalkoxysilane, and
10 mole % to 55 mole % of a $C_1$-$C_{12}$ alkyltrialkoxysilane, or
iii) 0.25 mole % to 25 mole % of a transition metal alkoxide and/or a transition metal oxide,
45 mole % to 90 mole % of a tetraalkoxysilane, and
10 mole % to 55 mole % of an aminoalkyl-, alkylaminoalkyl-, or
dialkylaminoalkyltrialkoxysilane, with the proviso that the total mol % of the transition metal alkoxide and/or transition metal oxide and tetraalkoxysilane and $C_1$-$C_{12}$ alkyltrialkoxysilane, if present, and the aminoalkyl-, alkylaminoalkyl-, or dialkylaminoalkyltrialkoxysilane, if present, does not exceed 100 mol %,
to the surface such that the thin film xerogel coating having a thickness of 1 to 20 microns is formed on the surface.

8. The method of claim 7, wherein the thin film xerogel coating has a surface roughness of greater than 1 nm.

9. The method of claim 7, wherein the surface selected from the group consisting of woods, plastics, glasses, metals, and combinations thereof.

10. A method of using a surface susceptible to fouling in a marine environment comprising:
applying a sol-gel composition comprising:
i) 0.25 mole % to 50 mole % of a transition metal alkoxide and/or a transition metal oxide, with the proviso that the total mol % of the transition metal alkoxide and/or transition metal oxide and tetraalkoxysilane does not exceed 100 mol %, and 50 to 99.75 mole % of a tetraalkoxysilane, or
ii) 0.25 mole % to 25 mole % of a transition metal alkoxide,
45 mole % to 90 mole % of a tetraalkoxysilane, and
10 mole % to 55 mole % of a $C_1$-$C_{12}$ alkyltrialkoxysilane, or
iii) 0.25 mole % to 25 mole % of a transition metal alkoxide and/or a transition metal oxide,
45 mole % to 90 mole % of a tetraalkoxysilane, and
10 mole % to 55 mole % of an aminoalkyl-, alkylaminoalkyl-, or
dialkylaminoalkyltrialkoxysilane, with the proviso that the total mol % of the transition metal alkoxide and/or transition metal oxide and tetraalkoxysilane and $C_1$-$C_{12}$ alkyltrialkoxysilane, if present, and the aminoalkyl-, alkylaminoalkyl-, or dialkylaminoalkyltrialkoxysilane, if present, does not exceed 100 mol %,
to the surface such that the thin film xerogel coating having a thickness of 1 to 20 microns is formed on the surface, and exposing the thin film xerogel coated surface to the marine environment,
wherein the thin film xerogel coated surface exhibits reduced fouling relative to a same surface that is not coated with the thin film xerogel coating or non-observable fouling after contact with the marine environment.

11. The method of claim 10, wherein the surface selected from the group consisting of woods, plastics, glasses, metals, and combinations thereof.

12. The method of claim 10, wherein the aqueous environment is naturally occurring or man-made and is fresh water or salt water.

13. The method of claim 10, wherein the aqueous environment is a marine environment.

14. The method of claim 7, wherein the film has a contact angle of greater than 90 degrees.

15. A composition comprising a transition metal oxide and silicon oxide xerogel matrix,
wherein the xerogel matrix is formed from a sol-gel composition comprising:
0.25 mole % to 25 mole % of a transition metal alkoxide and/or a transition metal oxide, and
45 mole % to 90 mole % of a tetraalkoxysilane, and
wherein the sol-gel composition further comprises:
10 mole % to 55 mole % of a $C_1$-$C_{12}$ alkyltrialkoxysilane or
10 mole % to 55 mole % of an aminoalkyl-, alkylaminoalkyl-, or
dialkylaminoalkyltrialkoxysilane, with the proviso that the total mol % of the transition metal alkoxide and/or transition metal oxide and tetraalkoxysilane and $C_1$-$C_{12}$ alkyltrialkoxysilane, if present, and the aminoalkyl-, alkylaminoalkyl-, or dialkylaminoalkyltrialkoxysilane, if present, does not exceed 100 mol %,
wherein the aminoalkyl-, alkylaminoalkyl-, or dialkylaminoalkyltrialkoxysilane is selected from the group consisting of aminopropyltriethoxysilane (AP or APTES), methylaminopropyltriethoxysilane (MAP), or dimethylaminopropyltriethoxysilane (DMAP), and combinations thereof.

16. A composition comprising a transition metal oxide and silicon oxide xerogel matrix,
wherein the xerogel matrix is formed from a sol-gel composition comprising:
0.25 mole % to 25 mole % of a transition metal alkoxide and/or a transition metal oxide, and
45 mole % to 90 mole % of a tetraalkoxysilane, and
wherein the sol-gel composition further comprises:
10 mole % to 55 mole % of a $C_1$-$C_{12}$ alkyltrialkoxysilane or
10 mole % to 55 mole % of an aminoalkyl-, alkylaminoalkyl-, or
dialkylaminoalkyltrialkoxysilane, with the proviso that the total mol % of the transition metal alkoxide and/or transition metal oxide and tetraalkoxysilane and $C_1$-$C_{12}$ alkyltrialkoxysilane, if present, and the aminoalkyl-, alkylaminoalkyl-, or dialkylaminoalkyltrialkoxysilane, if present, does not exceed 100 mol %,
wherein the transition metal alkoxide is selected from the group consisting of titanium tetraisopropoxide (TTIP), oxovanadium triisopropoxide (VOTIP), or tungsten pentaisopropoxide (WPIP), and combinations thereof and/or the transition metal oxide is selected from vanadium oxide ($V_2O_5$).

17. A composition comprising a transition metal oxide and silicon oxide xerogel matrix,
wherein the xerogel matrix is formed from a sol-gel composition comprising:
0.25 mole % to 25 mole % of a transition metal alkoxide and/or a transition metal oxide, and
45 mole % to 90 mole % of a tetraalkoxysilane, and
wherein the sol-gel composition further comprises:
10 mole % to 55 mole % of a $C_1$-$C_{12}$ alkyltrialkoxysilane or
10 mole % to 55 mole % of an aminoalkyl-, alkylaminoalkyl-, or
dialkylaminoalkyltrialkoxysilane, with the proviso that the total mol % of the transition metal alkoxide and/or transition metal oxide and tetraalkoxysilane and $C_1$-$C_{12}$ alkyltrialkoxysilane, if present, and the aminoalkyl-, alkylaminoalkyl-, or dialkylaminoalkyltrialkoxysilane, if present, does not exceed 100 mol %,
wherein iii) the tetraalkoxysilane is selected from the group consisting of tetramethoxysilane (TMOS), tetraethoxysilane (TEOS), or tetraisopropoxysilane (TIPOS), and combinations thereof.

* * * * *